US012221549B2

(12) United States Patent
Gotou et al.

(10) Patent No.: US 12,221,549 B2
(45) Date of Patent: Feb. 11, 2025

(54) SET OF INKJET INKS, INKJET IMAGE FORMING METHOD, AND INKJET IMAGE FORMING APPARATUS

(71) Applicants: Hiroshi Gotou, Kanagawa (JP); Toshiyuki Kobashi, Tokyo (JP); Daisuke Ozaki, Kanagawa (JP); Juichi Furukawa, Kanagawa (JP)

(72) Inventors: Hiroshi Gotou, Kanagawa (JP); Toshiyuki Kobashi, Tokyo (JP); Daisuke Ozaki, Kanagawa (JP); Juichi Furukawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 110 days.

(21) Appl. No.: 18/050,343

(22) Filed: Oct. 27, 2022

(65) Prior Publication Data

US 2023/0132661 A1    May 4, 2023

(30) Foreign Application Priority Data

Oct. 29, 2021 (JP) ................. 2021-177238

(51) Int. Cl.
| | | |
|---|---|---|
| *C09D 11/54* | (2014.01) | |
| *C09D 11/08* | (2006.01) | |
| *C09D 11/107* | (2014.01) | |
| *C09D 11/322* | (2014.01) | |
| *C09D 11/38* | (2014.01) | |
| *C09D 11/40* | (2014.01) | |
| *D06P 5/30* | (2006.01) | |

(52) U.S. Cl.
CPC .............. *C09D 11/40* (2013.01); *C09D 11/08* (2013.01); *C09D 11/107* (2013.01); *C09D 11/322* (2013.01); *C09D 11/38* (2013.01); *C09D 11/54* (2013.01); *D06P 5/30* (2013.01)

(58) Field of Classification Search
CPC ....... C09D 11/40; C09D 11/08; C09D 11/107; C09D 11/322; C09D 11/38; C09D 11/54; D06P 5/30
See application file for complete search history.

(56) References Cited

U.S. PATENT DOCUMENTS

| | | | |
|---|---|---|---|
| 6,736,887 B1 | 5/2004 | Tsutsumi et al. | |
| 2011/0141174 A1* | 6/2011 | Usuda | B41J 2/2114 347/12 |
| 2014/0132661 A1 | 5/2014 | Numaru et al. | |
| 2019/0100871 A1* | 4/2019 | Taga | D06P 1/5257 |
| 2020/0157366 A1 | 5/2020 | Gotou et al. | |
| 2020/0354598 A1 | 11/2020 | Yokohama et al. | |
| 2021/0122888 A1* | 4/2021 | Yabumoto | D06M 13/432 |

(Continued)

FOREIGN PATENT DOCUMENTS

| | | |
|---|---|---|
| JP | 2000-053897 | 2/2000 |
| JP | 2001-139849 | 5/2001 |
| JP | 3387845 | 3/2003 |

(Continued)

*Primary Examiner* — Yaovi M Ameh
(74) *Attorney, Agent, or Firm* — Grüneberg and Myers PLLC

(57) ABSTRACT

A set of inkjet inks used for forming an image by application of an ink on a cloth is provided. The set includes an ink and a pre-processing fluid. The pre-processing fluid contains water, a compound that flocculates an anionic compound, and at least one emulsified sizing agent.

12 Claims, 3 Drawing Sheets

(56) References Cited

U.S. PATENT DOCUMENTS

2021/0155012 A1  5/2021  Gotou et al.
2022/0024217 A1  1/2022  Sakaguchi et al.

FOREIGN PATENT DOCUMENTS

| JP | 2005349824 A | * | 12/2005 | ............. B41M 5/41 |
| JP | 2008-266853 | | 1/2008 | |
| JP | WO2012/132403 A1 | | 10/2012 | |

* cited by examiner

SET OF INKJET INKS, INKJET IMAGE FORMING METHOD, AND INKJET IMAGE FORMING APPARATUS

CROSS-REFERENCE TO RELATED APPLICATION

The present application claims priority under 35 U.S.C. § 119 to Japanese Patent Application No. 2021-177238, filed Oct. 29, 2021. The contents of which are incorporated herein by reference in their entirety.

BACKGROUND OF THE INVENTION

1. Field of the Invention

The present disclosure relates to a set of inkjet inks, an inkjet image forming method, and an inkjet image forming apparatus.

2. Description of the Related Art

Inkjet printing methods have been becoming increasingly widespread in recent years, because the inkjet printing methods can print color images easily and have low running costs. However, the inkjet printing methods often generate image defects represented by blurred text depending on the combination of inks and print media, and suffer from a problem that the image quality is significantly reduced. In this regard, a well-known technique applies a pre-process to print media using a pre-processing fluid containing, for example, a cationic compound. For example, Japanese Unexamined Patent Application Publication No. 2008-266853 proposes a pre-processing fluid for inkjet printing containing, for example, a water-soluble multivalent metal salt and a specific resin emulsion, as such a pre-processing fluid.

SUMMARY OF THE INVENTION

According to the present disclosure, it is a general object to provide a set of inkjet inks with which it is possible to improve a covering power and to inhibit occurrence of image blurring.

According to an embodiment, a set of inkjet inks for solving the problem described above is as follows.

A set of inkjet inks used for forming an image by application of an ink on a cloth is provided. The set of inkjet inks includes an ink and a pre-processing fluid. The pre-processing fluid contains water, a compound that flocculates an anionic compound, and at least one emulsified sizing agent.

According to the present disclosure, it is possible to provide a set of inkjet inks with which it is possible to improve a covering power and to inhibit occurrence of image blurring.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 1:
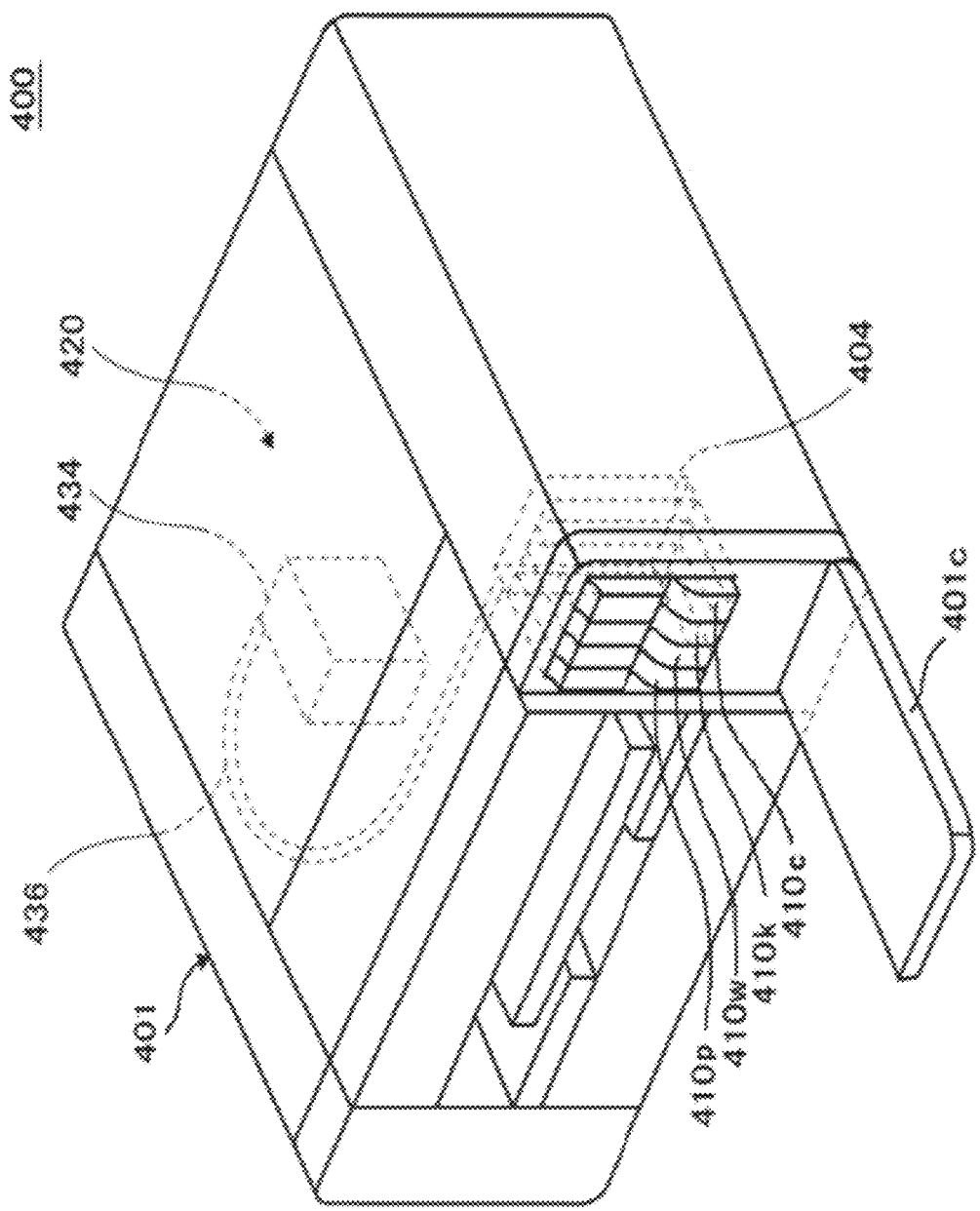
FIG. 1 is a schematic oblique view illustrating an example of an inkjet image forming apparatus according to the present disclosure.

In the following, embodiments of the present invention will be described with reference to the accompanying drawings.

According to an existing set of inkjet inks including inks and a pre-processing fluid and used for forming an image by application of the inks on a cloth, a cloth is pre-processed with the pre-processing fluid containing at least water and a compound that flocculates an anionic compound, and a white ink or a color ink is then discharged onto the cloth by an inkjet method, to form an image.

However, existing techniques have problems that an ink has an insufficient covering power on a cloth, and that image blurring occurs.

In the present disclosure, "covering power" means how well the ink covers or conceals a cloth serving as a print medium. When a white ink is used as the ink, "covering power" means "white covering power". When a color ink is used as the ink, "covering power" means "color developability".

In the present disclosure, "image blurring" comprehends both of "beading" (image density unevenness) that occurs when droplets of the ink merge with each other between adjoining dots, and "color bleed" that occurs when two or more color inks that form an image mix into the other color ink or any other color inks unilaterally or mutually at the boundary between the colors.

The present inventors have also found existing techniques problematic in the followings. When a cloth has a deep color, an image formed with a white ink on the deep-color cloth that has been pre-processed with the pre-processing fluid has a poor white covering power, and image defects such as beading occur. When a cloth has a light color, an image formed with color inks on the light-color cloth that has been pre-processed with the pre-processing fluid has a poor color developability, and color bleed and beading occur. Moreover, when an image is formed on a white ink layer with a color ink, there are problems such as occurrence of color bleed and beading.

According to the present inventors' studies into these problems, it has been confirmed that an image formed by discharging a white ink onto a deep-color cloth by an inkjet method has a significantly improved white covering power if the image is formed after the deep-color cloth is pre-processed with a pre-processing fluid that contains at least one emulsified sizing agent in addition to water and a compound that flocculates an anionic compound. It has also been confirmed that such a white image is also improved in anti-beading.

According to the present disclosure, the white covering power is evaluated based on brightness by Hunter.

Moreover, it has also been confirmed that an image formed by discharging a color ink onto a light-color cloth by an inkjet method after the light-color cloth is pre-processed with the pre-processing fluid specified above is improved in color developability and anti-color bleed and anti-beading.

It has also been confirmed that when a white ink layer is formed by discharging a white ink onto a cloth by an inkjet method after the cloth is pre-processed with the pre-processing fluid and an image is formed by discharging a color ink onto the white ink layer by an inkjet method, anti-color bleed and anti-beading are improved.

The exact mechanism behind the improvements has not been elucidated. However, it is inferred that the pre-processing fluid additionally containing an emulsified sizing agent imparts some water repellency to the surface of a cloth pre-processed with the pre-processing fluid, so inks are kept surfaced on the cloth and have an improved covering power, and inks inhibited from permeating the cloth can inhibit blurring. Particularly, it is inferred that occurrence of beading can be inhibited.

Embodiments of the disclosure will be described below. The following embodiments are illustrative, and not to limit the invention. Appropriate modifications may be made thereunto within the scope of the concept readable from the specification. A set of inkjet inks and an inkjet image forming method that are thus modified are also included within the technical scope of the invention.

(Set of Inkjet Inks)

A set of inkjet inks according to the disclosure is used for forming an image by application of inks on a cloth, and includes inks and a pre-processing fluid.

What only matters to "a set of inkjet inks" according to the present disclosure is separate existence of the inks and the pre-processing fluid. For example, the set of inkjet inks is not limited to, for example, a manufactured product or a sold product in a state in which ink storages storing the inks and a pre-processing fluid storage storing the pre-processing fluid are combined. For example, even if the ink storages and the pre-processing fluid storage are, for example, separate manufactured or sold products, they are comprehended within the set of inkjet inks according to the present disclosure so long as combined use of the inks and the pre-processing fluid is assumed, or combined use of the inks and the pre-processing fluid is substantially invited.

[Pre-Processing Fluid]

A pre-processing fluid included in the set of inkjet inks according to the present disclosure and used for processing a surface of a print medium (cloth) contains water, a compound that can flocculate anionic compounds such as water-dispersible particles of resins and colorants contained in inks, at least one emulsified sizing agent, and further contains other components as needed.

<Compound that Flocculates Anionic Compound>

The compound that can flocculate an anionic compound is not particularly limited and may be appropriately selected in accordance with the intended purpose. Cationic compounds are preferable. Inorganic metal salts, organic acid metal salts, organic acid ammonium salts, cation polymers, and cationic surfactants are more preferable. At least one selected from the group consisting of inorganic metal salts, organic acid metals salts, organic acid ammonium salts, and cation polymers that are water-soluble is particularly preferable. One of these compounds may be used alone, or two or more of these compounds may be used in combination.

The pre-processing fluid containing the compound that flocculates an anionic compound has an effect of flocculating pigment particles and resin particles contained in an ink, and can realize print qualities with little blurring (beading and color bleed), and less text letters printed too bold and illegible.

When the inorganic metal salt, the organic acid metal salt, or the organic acid ammonium salt is at least one selected from calcium salts, magnesium salts, nickel salts, and aluminum salts, a particularly good effect of flocculating water-dispersible particles is obtained. With the effect of flocculating anionic compounds such as pigment particles and resin particles contained in an ink, it is possible to obtain print qualities with little blurring (beading and color bleed), and less text letters printed too bold and illegible. Moreover, these salts are also preferable in terms of an excellent storage stability.

—Inorganic Metal Salt—

The inorganic metal salt is not particularly limited. Examples of the inorganic metal salt include magnesium sulfate, aluminum sulfate, manganese sulfate, nickel sulfate, ferrous sulfate, copper (II) sulfate, zinc sulfate, ferrous nitrate, ferric nitrate, cobalt nitrate, strontium nitrate, copper (II) nitrate, nickel (II) nitrate, lead (II) nitrate, manganese (II) nitrate, nickel (II) chloride, calcium chloride, tin (II) chloride, strontium chloride, barium chloride, and magnesium chloride. Examples of water-soluble monovalent alkali metal salt compounds include sodium sulfate, potassium sulfate, lithium sulfate, sodium bisulfate, potassium hydrogen sulfate, sodium nitrate, potassium nitrate, sodium carbonate, potassium carbonate, sodium bicarbonate, potassium hydrogen carbonate, sodium chloride, and potassium chloride. One of these metal salts may be used alone or two or more of these metal salts may be used in combination.

—Organic Acid Metal Salt—

The organic acid metal salt is not particularly limited. Examples of the organic acid metal salt include monosodium L-aspartate, magnesium L-aspartate, calcium ascorbate, sodium L-ascorbate, sodium succinate, disodium succinate, diammonium succinate, aluminum citrate, potassium citrate, calcium citrate, ammonium citrate tribasic, tri-potassium citrate, trisodium citrate, diammonium citrate, disodium citrate, zinc lactate, aluminum lactate, ammonium lactate, potassium lactate, calcium lactate, sodium lactate, magnesium lactate, calcium acetate, potassium tartrate, calcium tartrate, sodium DL-tartrate, and potassium sodium tartrate. One of these organic acid metal salts may be used alone or two or more of these organic acid metal salts may be used in combination.

—Organic Acid Ammonium Salt—

The organic acid ammonium salt is not particularly limited. Examples of the organic acid ammonium salt include ammonium acetate, ammonium propionate, ammonium lactate, ammonium oxalate, ammonium tartrate, ammonium succinate (diammonium succinate), diammonium malonate, diammonium hydrogen citrate, ammonium citrate tribasic, and monoammonium L-glutamate. One of these organic acid ammonium salts may be used alone or two or more of these organic acid ammonium salts may be used in combination.

—Cation Polymer—

The cation polymer is not particularly limited. Quaternary ammonium salt-type cationic high-molecular-weight compounds are preferable. Examples of the quaternary ammonium salt-type cationic high-molecular-weight compounds include dialkyl allyl ammonium chloride polymers, dialkyl aminoethyl (meth)acrylate quaternary ammonium salt polymers, modified polyvinyl alcohol dialkyl ammonium salt polymers, and dialkyl diallyl ammonium salt polymers. Examples of other cation polymers include cationic specially modified polyamine compounds, cationic polyamide polyamine compounds, cationic urea-formalin resin compounds, cationic polyacrylamide compounds, cationic alkyl ketene dimers, cationic dicyandiamide compounds, cationic dicyandiamide-formalin condensate compounds, cationic dicyandiamide-polyamine condensate compounds, cationic polyvinyl formamide compounds, cationic polyvinyl pyridine compounds, cationic polyalkylene polyamine compounds, and cationic epoxypolyamide compounds. One of these cation polymers may be used alone or two or more of these cation polymers may be used in combination. Compounds represented by any of General formulae (1) to (3) below are particularly preferable.

General formula (1)

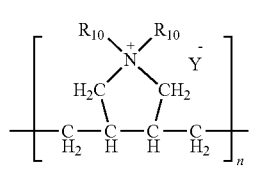

[In General formula (1), two $R_{19}$ each independently represent a methyl group or an ethyl group, $Y^-$ represents a halogen ion, and n represents an integer.]

General formula (2)

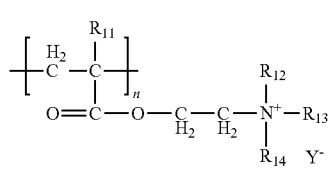

[In General formula (2), $Y^-$ represents any anion selected from a halogen ion, a nitrate ion, a nitrite ion, and an acetate ion, $R_{11}$ represents H or $CH_3$, $R_{12}$, $R_{13}$, and $R_{14}$ each independently represent H or an alkyl group, and n represents an integer.]

General formula (3)

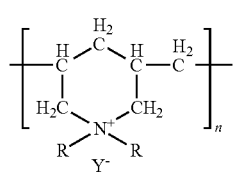

[In General formula (3), R represents a methyl group or an ethyl group, $Y^-$ represents any anion selected from a halogen ion, a nitrate ion, a nitrite ion, and an acetate ion, and n represents an integer.]

—Cationic Surfactant—

The cationic surfactant is not particularly limited. Examples of the cationic surfactant include benzalkonium chloride, distearyl dimethyl ammonium chloride, benzethonium chloride, cetyl pyridinium chloride, hexadecyl trimethyl ammonium bromide, and dequalinium chloride. One of these cationic surfactants may be used alone or two or more of these cationic surfactants may be used in combination.

The content of the compound that flocculates an anionic compound is not particularly limited and is preferably 0.1% by mass or greater and 30% by mass or less and more preferably 1% by mass or greater and 20% by mass or less relative to the whole amount of the pre-processing fluid. When the content of the compound that flocculates an anionic compound is greater than 30% by mass, an organic acid salt compound may precipitate by failing to sufficiently dissolve. When the content of the compound that flocculates an anionic compound is less than 0.1% by mass, the improvement in print qualities may be less significant.

<Emulsified Sizing Agent>

The sizing agent is used in the papermaking field. It is necessary that the sizing agent used in the pre-processing fluid for inkjet inks have an emulsion form.

The emulsified sizing agent is not particularly limited. At least one selected from the group consisting of rosin-based sizing agents, compounds represented by General formula (I) below, polyacrylamide-based resins, and fatty acid amide-based resin compounds is particularly preferable.

General formula (I)

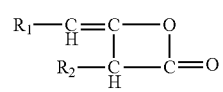

[In General formula (I), $R_1$ and $R_2$ each independently represent an alkyl group.]

—Rosin-Based Sizing Agent—

The rosin-based sizing agent is not particularly limited. At least one selected from the group consisting of maleated rosin compounds and acrylated rosin compounds is preferable in terms of inhibiting permeation of inks into a print medium.

As the rosin-based sizing agent, rosin sizing agents used in papermaking can be used. Examples of rosin sizing agents include: sizing agents available from Arakawa Chemical Industries, Ltd. such as "SIZE PINE N-771", "SIZE PINE N-775", "SIZE PINE N-795", "SIZE PINE N-1000F", "SIZE PINE N-811", "SIZE PINE N-817", "SIZE PINE N-880", "SIZE PINE NT-78", "POLYMARONE 351T", "POLYMARONE 360", and "POLYMARONE 1383"; sizing agents available from Seiko PMC Corporation such as "AL1203", "AL1309", "CC1401", and "CC1404"; and sizing agents available from Harima Chemicals Group, Inc. such as "HAARSIZE NES-500", "HARSIZE NES-687", "HARSIZE NES-745", "HARSIZE NES-748", "NEUROZ-CF50", and "NEUROZ-ES50".

—Compound Represented by General Formula (I)—

$R_1$ and $R_2$ of the compound represented by General formula (I) each independently represent an alkyl chain containing from 12 through 22 carbon atoms, and a more preferable effect is expected when the number of carbon atoms in the alkyl chain is 16 or greater. As the compound represented by General formula (I), alkyl ketene dimer sizing agents used in papermaking can be used. Examples of alkyl ketene dimer sizing agents include: sizing agents available from Arakawa Chemical Industries, Ltd. such as "SIZE PINE K-287", "SIZE PINE K-903-20", "SIZE PINE K-931", "SIZE PINE K-924", and "SIZE PINE K-921"; and sizing agents available from Seiko PMC Corporation such as "AD1602", "AD1606", "AD1608", "AD1612", "AD1614", "AD1638", and "AD1640".

—Polyacrylamide-Based Resin—

As the polyacrylamide-based resin, polyacrylamide-based sizing agents used in papermaking can be used. Examples of polyacrylamide-based sizing agents include sizing agents available from Arakawa Chemical Industries, Ltd. such as "POLYSTRON 372", "POLYSTRON 379", "POLYSTRON 387-20", "POLYSTRON 1228", "POLYSTRON 1250", "POLYSTRON 1254", "POLYSTRON 1259", "POLY- STRON 1262", "POLYSTRON 1265", "POLYSTRON 1267", "POLYSTRON 1276", "POLYSTRON 1280", "POLYSTRON 1415", "POLYSTRON 1430", "POLYSTRON 1810", "POLYSTRON 1812", "POLYSTRON 2806", "POLYSTRON 1510F", and "POLYSTRON 1570F"; and sizing agents available from Harima Chemicals Group, Inc. such as "HARMIDE EX-200 SERIES", "HARMIDE EX-400 SERIES", "HARMIDE RB-200 SERIES", "HARMIDE RB-400 SERIES", and "HARMIDE KS SERIES".

—Fatty Acid Amide-Based Resin Compound—

Examples of fatty acid amide-based sizing agents used in papermaking include sizing agents available from Arakawa Chemical Industries, Ltd. such as "SIZE PINE DL-15" and "SIZE PINE DL-FA20".

The content of the emulsified sizing agent in the pre-processing fluid when expressed as the content of the sizing agent having a solid form is not particularly limited and is preferably 0.5% by mass or greater and 5% by mass or less and more preferably 1% by mass or greater and by mass or less relative to the whole amount of the pre-processing fluid. When the content of the emulsified sizing agent is greater than 5% by mass, the effect of the sizing agent is sufficiently saturated and there is no cost advantage. When the content of the emulsified sizing agent is less than 0.5% by mass, the effect of improving brightness by Hunter (white covering power) and inhibiting beading (density unevenness) of an image portion may be low.

<Water>

As the water contained in the pre-processing fluid, for example, pure water such as ion-exchanged water, ultrafiltrated water, reverse osmotic water, and distilled water, and ultrapure water can be used. One of these kinds of water may be used alone or two or more of these kinds of water may be used in combination.

The content of the water in the pre-processing fluid is not particularly limited, may be appropriately selected in accordance with the intended purpose, and is preferably 40% by mass or greater and 90% by mass or less and more preferably 50% by mass or greater and 85% by mass or less relative to the whole amount of the pre-processing fluid because dissolution of the compound that flocculates an anionic compound and an appropriate viscosity can be maintained.

<Resin Particles>

When adhesiveness between a print medium (hereinafter also referred to as "base material") and an ink is taken into consideration, it is preferable that the pre-processing fluid further contains resin particles. For co-presence with a cationic high-molecular-weight compound serving as the compound that flocculates an anionic compound, preferable resin particles are nonionic water-dispersible resin particles. For a long-term storage stability of the resin particles in the co-presence with the cationic high-molecular-weight compound, preferable resin particles are nonionic water-dispersible resin particles dispersed by steric hindrance, instead of a charge repulsive emulsion commonly used.

—Nonionic Water-Dispersible Resin Particles—

The nonionic water-dispersible resin particles are not particularly limited. However, it is preferable that the nonionic water-dispersible resin particles have a glass transition temperature (Tg) of −30° C. or higher and 80° C. or lower, because an image formed with an ink has an appropriate flexibility and an excellent balance between a laminate strength and scratch resistance. The nonionic water-dispersible resin particles are water-dispersible resin particles that can be dispersed without utilizing charges.

The nonionic water-dispersible resin particles represent resin particles from which no monomer containing an acidic functional group such as a carboxyl group and a sulfo group or a basic functional group such as an amino group is detected when the resin particles are subjected to pyrolytic gas chromatography-mass spectrometry (GC-MS) (by, for example, GC-17A available from Shimadzu Corporation) after being isolated as a solid from a liquid composition by centrifugation.

The chemical structure of the nonionic water-dispersible resin particles is not particularly limited. Any kind of resin particles can be used so long as such resin particles are nonionic and water-dispersible. The nonionic water-dispersible resin particles are preferably at least one kind selected from polyolefin resins, chlorinated polyolefin resins, polyvinyl acetate resins, polyvinyl chloride resins, polyester resins, polyurethane resins, acrylic resins, styrene butadiene resins, and copolymers of these resins, because a strong adhesiveness with various kinds of base materials can be obtained. The nonionic water-dispersible resin particles are more preferably ethylene-vinyl acetate copolymer resins, ethylene-vinyl acetate-vinyl chloride copolymer resins, and chlorinated olefin resins.

The glass transition temperature (Tg) of the nonionic water-dispersible resin particles is not particularly limited, and is preferably −30° C. or higher and 80° C. or lower and more preferably −25° C. or higher and 70° C. or lower.

When Tg of the nonionic water-dispersible resin particles is −30° C. or higher, there is an advantage that a coating film of the resin has a sufficient toughness, and a pre-process layer formed of the pre-processing fluid has a greater robustness. When Tg of the nonionic water-dispersible resin particles is 80° C. or lower, there is an advantage that the resin has an improved film forming performance and also a sufficient flexibility, so adhesiveness with a base material is stronger.

The content of the nonionic water-dispersible resin particles is not particularly limited. The content of the nonionic water-dispersible resin particles when expressed as a content of the nonionic water-dispersible resin particles having a solid form is preferably 0.5% by mass or greater and 20% by mass or less relative to the whole amount of the pre-processing fluid.

When the content of the nonionic water-dispersible resin particles is 0.5% by mass or greater, adhesion to a base material is improved because the base material can be sufficiently coated with the resin. When the content of the nonionic water-dispersible resin particles is 20% by mass or less, adhesion to a base material is not spoiled because the resin particles do not form a film having a film thickness greater than necessary.

The medium of the pre-processing fluid according to the present disclosure is an aqueous medium. However, as needed, any other substance than water may be added to the pre-processing fluid. Examples of such substances include organic solvents, surfactants, and other trace additives.

<Organic Solvent>

The organic solvent used in the pre-processing fluid according to the present disclosure is not particularly limited. For example, a water-soluble organic solvent can be used. Examples of the water-soluble organic solvent include polyvalent alcohols, ethers such as polyvalent alcohol alkyl ethers and polyvalent alcohol aryl ethers, nitrogen-containing heterocyclic compounds, amides, amines, and sulfur-containing compounds. One of these organic solvents may be used alone or two or more of these solvents may be used in combination.

Specific examples of the water-soluble organic solvents include: polyvalent alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentandiol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyvalent alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methyl formamide, N,N-dimethyl formamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; and propylene carbonate and ethylene carbonate.

Since the organic solvent serves as a humectant and also imparts desirable drying properties, it is preferable to use an organic solvent having a boiling point of 250° C. or lower.

The content of the organic solvent in the pre-processing fluid is not particularly limited, may be appropriately selected in accordance with the intended purpose, and is preferably 5% by mass or greater and 60% by mass or less, more preferably 10% by mass or greater and 30% by mass or less, and yet more preferably 101 by mass or greater and 25% by mass or less relative to the whole amount of the pre-processing fluid in terms of a drying property and discharging reliability of the pre-processing fluid.

When the pre-processing fluid contains any of 1,2-propanediol, 1,3-butanediol, and 1,2-butanediol as the organic solvent, there is an advantage that resins have an improved film forming property and an improved scratch resistance.
<Surfactant>

As the surfactant, any of silicone-based surfactants, fluorosurfactants, amphoteric surfactants, nonionic surfactants, and anionic surfactants may be used. One of these surfactants may be used alone or two or more of these surfactants may be used in combination.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2$ $(CH_2CH_2OH)_2$, and $NH(CH_2CH_2OH)$ Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The pre-processing fluid may contain, for example, a defoaming agent, a preservative/fungicide, and a corrosion inhibitor, as the other trace additives.
<Defoaming Agent>

The defoaming agent has no particular limit. For example, silicone-based defoaming agents, polyether-based defoaming agents, and aliphatic acid ester-based defoaming agents are suitable. These can be used alone or in combination. Of these, silicone-based defoaming agents are preferable to easily break foams.
<Preservative/Fungicide>

The preservatives and fungicides are not particularly limited. A specific example is 1,2-benzisothiazolin-3-one.
<Corrosion Inhibitor>

The corrosion inhibitor has no particular limit. Examples thereof are acid sulfite, sodium thiosulfate, and 1,2,3-benzotriazole.
<Production of Pre-Processing Fluid>

It is possible to produce the pre-processing fluid by dispersing or dissolving the compound that flocculates an anionic compound, the emulsified sizing agent, the resin particles that are to be added as needed, and the other components in the water, and stirring and mixing these components. For the stirring and mixing, for example, a sand mill, a homogenizer, a ball mill, a paint shaker, an ultrasonic disperser, a stirrer using a typical stirring blade, a magnetic stirrer, and a high-speed disperser may be used.

[Inks]

The inks of the set of inkjet inks according to the present disclosure are not particularly limited. It is preferable that the inks contain an anionic compound, an organic solvent, and water. It is more preferable that the inks contain at least one organic solvent. The inks further contain other components as needed.

As described above, existing techniques have a problem that printing on cloth results in a poor covering power of an ink, particularly, a poor brightness by Hunter (white covering power) of a white ink, and in beading and color bleed of printed images.

According to the present disclosure, the organic solvent, the water, and the anionic compound (either or both of anionic resin particles and an anionic pigment dispersion) flocculate or thicken in viscosity. As a result, an improved covering power can be obtained, and occurrence of beading and color bleed of printed images can be inhibited.

<Organic Solvent>

The organic solvent used in the inks is not particularly limited. The inks may contain polyvalent alcohols having an equilibrium moisture content of 30% by mass or greater at a temperature of 23° C. at a relative humidity of 80% as a humectant. Among such polyvalent alcohols, those that have a higher equilibrium moisture content and a higher boiling point are more preferable as the organic solvent.

Examples of polyvalent alcohols having an equilibrium moisture content of 30% by mass or greater at a temperature of 23° C. at a relative humidity of 80% include diethylene glycol (bp: 245° C., equilibrium moisture content: 43% by mass), triethylene glycol (bp: 285° C., equilibrium moisture content: 39% by mass), tetraethylene glycol (bp: from 324° C. through 330° C., equilibrium moisture content: 37% by mass), 1,3-butanediol (bp: from 203° C. through 204° C., equilibrium moisture content: 35% by mass), glycerin (bp: 290° C., equilibrium moisture content: 49% by mass), diglycerin (bp: 270° C./20 hPa, equilibrium moisture content: 38% by mass), 1,2,3-butanetriol (bp: 175° C./33 hPa, equilibrium moisture content: 38% by mass), and 1,2,4-butanetriol (bp: from 190° C. through 191° C./24 hPa, equilibrium moisture content: 41% by mass). One of these polyvalent alcohols may be used alone or two or more of these polyvalent alcohols may be used in combination. Among these polyvalent alcohols, glycerin and 1,3-butanediol are preferable.

The equilibrium moisture content (%) is measured as follows. A desiccator is maintained at a temperature of 23° C.±1° C. and at a relative humidity of 80%13% using a potassium chloride/sodium chloride saturated aqueous solution (i.e., a saturated aqueous solution in which potassium chloride and sodium chloride are mixed at a ratio of 6:4 (mass ratio)), and a petri dish into which each organic solvent is weighed out by 1 g is stored in the desiccator, to measure the moisture content in the organic solvent when the equilibrium is reached. Then, the equilibrium moisture content is calculated according to the formula below.

Equilibrium moisture content (%)=[amount of moisture absorbed by organic solvent/(organic solvent+amount of moisture absorbed by organic solvent)]×100

Examples of organic solvents having an equilibrium moisture content of 30% by mass or greater at a temperature of 23° C. at a relative humidity of 80% other than the polyvalent alcohols specified above include 2-methyl-1,3-butanediol (bp: 214° C.), 3-methyl-1,3-butanediol (bp: 203° C.), dipropylene glycol (bp: 232° C.), 1,5-pentanediol (bp: 242° C.), propylene glycol (bp: 187° C.), 2-methyl-2,4-pentnediol (bp: 197° C.), ethylene glycol (bp: from 196° C. through 198° C.), tripropylene glycol (bp: 267° C.), hexylene glycol (bp: 197° C.), polyethylene glycol (viscous liquid or solid), polypropylene glycol (bp: 187° C.), 1,6-hexanediol (bp: from 253° C. through 260° C.), 1,2,6-hexanetriol (bp: 178° C.), trimethylolethane (solid, mp: from 199° C. through 201° C.), and trimethylolpropane (solid, mp: 61° C.).

The total content of any one or more of the organic solvents is not particularly limited and is preferably 10% by mass or greater and 75% by mass or less and more preferably 15% by mass or greater and 50% by mass or less relative to the whole amount of the ink.

When the total content of any one or more of the organic solvents is 10% by mass or greater, the effect of the organic solvents as a humectant of the ink is good. When the total content of any one or more of the organic solvents is 75% by mass or less, the ink has a good drying property on a print medium, and the quality of text on plain paper is good.

The organic solvent may help inhibit color bleed and beading, and also contributes to securing discharging stability and inhibiting adherence of waste inks to the maintenance mechanism of an ink discharging apparatus. Hence, use of the organic solvent within an appropriate range is preferable.

Moreover, it is preferable that the inks contain an organic solvent having a solubility parameter (SP value) of 9 (cal/cm$^3$)$^{1/2}$ or higher and 11.8 (cal/cm$^3$)$^{1/2}$ or lower in addition to the organic solvents specified above.

Examples of the organic solvent having a solubility parameter (SP value) of 9 (cal/cm$^3$)$^{1/2}$ or higher and 11.8 (cal/cm$^3$)$^{1/2}$ or lower include 3-ethyl-3-oxetane methanol (SP value: 11.31 (cal/cm$^3$)$^{1/2}$), 3-methyl-3-oxetane methanol (SP value: 11.79 (cal/cm$^3$)$^{1/2}$), β-methoxy-N, N-dimethyl propionamide (SP value: 9.19 (cal/cm$^3$)$^{1/2}$), R-butoxy-N, N-dimethyl propionamide (SP value: 9.03 (cal/cm$^3$)$^{1/2}$), 1,2-hexanediol (SP value: 11.8 (cal/cm$^3$)$^{1/2}$), 2-ethyl-1,3-hexaneiol (SP value: 11.07 (cal/cm$^3$)$^{1/2}$), 2,2,4-trimethyl-1, 3-pentanediol (SP value: 11.19 (cal/cm$^3$)$^{1/2}$), diethylene glycol monoethyl ether (SP value: 10.14 (J/cm$^3$)$^{1/2}$), 3-methoxy-1-butanol (SP value: 9.64 (cal/cm$^3$)$^{1/2}$), 3-methoxy-3-methyl-1-butanol (SP value 9.64 cal/cm$^3$)$^{1/2}$), 3-methyl-1,5-pentanediol (SP value: 11.8 (cal/cm$^3$)$^{1/2}$), methyl propylene triglycol (SP value: 9.43 (cal/cm$^3$)$^{1/2}$), diethylene glycol mono-n-butyl ether (SP value: 9.86 (cal/cm$^3$)$^{1/2}$), diethylene glycol monomethyl ether (SP value: 10.34 (cal/cm$^3$)$^{1/2}$), triethylene glycol monomethyl ether (SP value: 10.12 (cal/cm$^3$)$^{1/2}$), propylene glycol monopropyl ether (SP value: 9.82 (cal/cm$^3$)$^{1/2}$), propylene glycol monomethyl ether (SP value: 10.19 (cal/cm$^3$)$^{1/2}$), propylene glycol monobutyl ether (SP value: 9.69 (cal/cm$^3$)$^{1/2}$), 3-methoxy-1-butanol (SP value: 10.65 (cal/cm$^3$)$^{1/2}$), 3-methoxy-1-propanol (SP value: 10.41 (cal/cm$^3$)$^{1/2}$), dipropylene glycol monomethyl ether (SP value: 9.84 (cal/cm$^3$)$^{1/2}$), and 3-methyl-1,5-pentanediol (SP value: 11.80 (cal/cm$^3$)$^{1/2}$). One of these organic solvents may be used alone or two or more of these organic solvents may be used in combination.

The content of the organic solvent having a solubility parameter (SP value) of 9 (cal/cm$^3$)$^{1/2}$ or higher and 11.8 (cal/cm$^3$)$^{1/2}$ or lower is not particularly limited and is preferably 5% by mass or greater and 60% by mass or less and more preferably 10% by mass or greater and 30% by mass or less relative to the whole amount of the ink in terms of color developability, and inhibition of color bleed and beading.

<Anionic Compound>

It is preferable to use either or both of anionic resin particles (anionic resin emulsion) and an anionic pigment dispersion as a material containing the anionic compound.

<<Anionic Resin Particles>>

The anionic resin particles are not particularly limited so long as the anionic resin particles have an anionic property. Water-dispersible resin particles having an anionic property are preferable.

—Water-Dispersible Resin Particles—

As the resin serving as the material of the water-dispersible resin particles, one that has an excellent film forming property (image forming property), solvent resistance, a high water resistance, and a high weather resistance is useful in terms of printing images having a high water resistance and a high image density (a high color developability). Examples of such resins include condensation-type synthetic resins, addition-type synthetic resins, and natural high-molecular-weight compounds. Among these resins, polycarbonate-based polyurethane resins, polyether-based polyurethane resins, ad polyester-based polyurethane resins are preferable.

Examples of other condensation-type synthetic resins include polyester resins, polyepoxy resins, polyamide resins, polyether resins, poly(meth)acrylic resins, acrylic-silicone resins, and fluororesins. Examples of the addition-type synthetic resins include polyolefin resins, polystyrene resins, polyvinyl alcohol-based resins, polyvinyl ester-based resins, polyacrylic acid-based resins, and unsaturated carboxylic acid-based resins. Examples of the natural high-molecular-weight compounds include celluloses, rosins, and natural rubbers.

Among these kinds of resins, polyurethane resin particles are preferable in terms of ink fixability. Two or more kinds of such water-dispersible resin particles may be used in combination.

As the water-dispersible resin particles, resins having self-dispersibility by their own hydrophilic group, and non-dispersible resins to which dispersibility is imparted by a surfactant or by a hydrophilic group-containing resin can be used. Among such resins, emulsions of resin particles obtained by emulsion polymerization and suspension polymerization of polyester or polyurethane ionomers or of unsaturated monomers are the most appropriate.

For emulsion polymerization of an unsaturated monomer, for example, the unsaturated monomer, a polymerization initiator, a surfactant, a chain-transfer agent, a chelate agent, and a pH regulator are reacted with one another in water to which they are added, to obtain a resin emulsion. Therefore, a water-dispersible resin can be easily obtained, and it is easy to change the resin constitution and to create the intended properties.

A strong alkaline level or a strong acidic level induces molecular chain breakage of the water-dispersible resin particles, such as broken dispersion and hydrolysis. Therefore, the pH is preferably from 4 through 12, more preferably from 7 through 11 particularly in terms of miscibility with a water-dispersible colorant, and yet more preferably from 8 through 10.5.

The water-dispersible resin particles have a function of fixing a water-dispersible colorant on a print medium, and improving fixability of the colorant by changing into a coating film at normal temperature or higher. Therefore, the minimum filming temperature (MFT) of the water-dispersible resin particles is preferably 100° C. or lower.

When the glass transition temperature of the water-dispersible resin particles is −40° C. or lower, the coating film of the resin is strongly viscous and the printed image has tack. Therefore, the glass transition temperature of the water-dispersible resin particles is preferably −30° C. or higher. The content of the water-dispersible resin particles in the ink is not particularly limited. The content of the water-dispersible resin particles expressed as the content of the water-dispersible resin particles having a solid form is preferably 0.5% by mass or greater and 20% by mass or less and more preferably 1% by mass or greater and 15% by mass or less relative to the whole amount of the ink.

When producing an ink, the polyurethane resin particles are used in a dispersion liquid form. However, the content percentage of the polyurethane resin particles in the ink represents the content percentage of the polyurethane resin particles in the ink expressed as the content percentage of the polyurethane resin particles having a solid form.

<Colorant>

The inks according to the present disclosure may be clear inks free of a colorant. However, it is preferable that the inks contain a colorant. For example, a white ink, a cyan ink, a magenta ink, a yellow ink, and a black ink can be used. When the set of inkjet inks includes a white ink, it is possible to obtain an excellent white covering power by forming an image with the white ink even if a print medium has a deep color. When the set of inkjet inks includes color inks such as a cyan ink, a magenta ink, a yellow ink, and a black ink, it is possible to inhibit occurrence of beading and color bleed on color-printed images. Moreover, when the set of inkjet inks includes both of the white ink and the color inks, it is possible to inhibit occurrence of beading and color bleed also when images of the color inks are printed on an image of the white ink having an excellent white covering power.

According to the present disclosure, "a white ink" is a liquid composition that forms a white image when applied to a region, to which the pre-processing fluid is applied, of a print medium. According to the present disclosure, "a white color" is a color referred to as white in light of commonly accepted norms, and comprehends slightly tinted whites.

The set of inkjet inks may include one such white ink alone or two or more such white inks.

According to the present disclosure, "a color ink" is a liquid composition that forms a color image when applied to a region, to which the pre-processing fluid is applied, of a print medium, or to a region, to which the white ink is applied, of the region, to which the pre-processing fluid is applied, of the print medium.

According to the present disclosure, "colors" represent any colors that are not comprehended within the "white color", and include, for example, black, cyan, magenta, and yellow.

The set of inkjet inks may include one such color ink alone or two or more such color inks.

The colorant is not particularly limited so long as the colorant has an anionic property. A pigment having an anionic property is preferable.

Examples of the pigment having an anionic property include surfactant-dispersed pigments dispersed by surfactants, resin-dispersed pigments dispersed by resins, resin-coated/dispersed pigments of which surface is coated with resins, and self-dispersed pigments containing a hydrophilic group on the surface of the pigments. Water-dispersible pigments are preferable. Among such pigments, resin-coated pigments, or self-dispersed pigments containing at least one hydrophilic group on the surface of the pigments are preferable.

Examples of such a hydrophilic group include —COOM, —SO$_3$M, —PO$_3$HM, —PO$_3$M$_2$, —CONM$_2$, —SO$_3$NM$_2$, —NH—$C_6H_4$—COOM, —NH—$C_6H_4$—$SO_3$M, —NH—$C_6H_4$—$PO_3$HM, —NH—$C_6H_4$—$PO_3M_2$, —NH—$C_6H_4$—$CONM_2$, and —NH—$C_6H_4$—$SO_3NM_2$. It is possible to introduce these hydrophilic groups by a publicly-known method.

A quaternary ammonium ion is preferable as the counterion M. Specific examples of the quaternary ammonium ion include tetramethyl ammonium ion, tetraethyl ammonium ion, tetrapropyl ammonium ion, tetrabutyl ammonium ion, tetrapentyl ammonium ion, benzyl trimethyl ammonium ion, benzyl triethyl ammonium ion, and tetrahexyl ammonium ion. Among these quaternary ammonium ions, tetraethyl ammonium ion, tetrabutyl ammonium ion, and benzyl trimethyl ammonium ion are preferable, and tetrabutyl ammonium ion is particularly preferable.

What should be specially mentioned among the properties of an ink containing the pigment specified above is a high storage stability over time, which inhibits thickening of the ink in viscosity when water evaporation occurs. A factor that contributes to this is inferred to be the quaternary ammonium ion-containing hydrophilic group, which can keep the pigment stably dispersed in the ink even when the content percentage of organic solvents in the ink increases due to water evaporation from the ink having a high content percentage of water.

As a colorant other than the pigment containing the hydrophilic group, a polymer emulsion obtained by adding a pigment to polymer particles is preferable. The pigment may be encapsulated with the polymer particles or may be adsorbed to the surface of the polymer particles. In this case, not all pigment particles need be encapsulated or adsorbed, and some pigment particles may be dispersed in the emulsion. Examples of the polymer of the polymer particles include vinyl-based polymers, polyester-based polymers, and polyurethane-based polymers. Vinyl-based polymers and polyester-based polymers are particularly preferable. Specific examples of the vinyl-based polymers and the polyester-based polymers include those that are disclosed in Japanese Unexamined Patent Application Publications Nos. 2000-53897 and 2001-139849.

Commonly used organic pigments, or composite pigments in which inorganic pigment particles are coated with organic pigments or carbon black may also be used. It is possible to produce the composite pigment by, for example, a method of depositing an organic pigment in the presence of inorganic pigment particles, and a mechanochemical method of mechanically mixing and grinding an inorganic pigment and an organic pigment. Moreover, as needed, it is optional to improve adhesiveness between an inorganic pigment and an organic pigment by providing a layer of an organo-silane compound produced from polysiloxane or alkylsilane between the inorganic pigment and the organic pigment.

The mass ratio between the inorganic pigment particles and the organic pigment or carbon black serving as a colorant is preferably from 3:1 through 1:3 and more preferably from 3:2 through 1:2. When the content of the colorant is in the range specified above, color developability and coloring powers are not poor, and clearness and color tone are not poor.

As the composite pigment, for example, silica/carbon black composite materials, silica/phthalocyanine PB15:3 composite materials, silica/disazo yellow composite materials, and silica/quinacridone PR122 composite materials available from Toda Kogyo Corp. are preferable because they have a small average primary particle diameter.

When inorganic pigment particles having a primary particle diameter of 20 nm are coated with an organic pigment in an equal quantity, the resulting pigment has a primary particle diameter of approximately 25 nm. If it is possible to disperse this composite pigment to a primary particle level using an appropriate dispersant, it is possible to produce a significantly minute pigment-dispersed ink having a dispersed pigment diameter of 25 nm. The organic pigment on the surface of the composite pigment does not merely contribute to dispersion. Therefore, it is also important to select a pigment dispersant that can disperse and stabilize both of the organic pigment and the inorganic pigment at the same time, because the characteristic of the inorganic pigment present in the core surfaces through the thin layer of the organic pigment having a thickness of about 2.5 nm.

Examples of the inorganic pigment include titanium oxide, iron oxide, calcium carbonate, barium sulfate, aluminum hydroxide, barium yellow, cadmium red, chrome yellow, and carbon black. Among these inorganic pigments, carbon black is preferable.

Examples of the carbon black include channel black, furnace black, gas black, and lamp black produced by publicly-known methods such as a contact method, a furnace method, and a thermal method.

Examples of the organic pigment include azo-pigments, polycyclic pigments, dye chelates, nitro pigments, nitroso pigments, and aniline black. Among these organic pigments, for example, azo-pigments and polycyclic pigments are preferable. Examples of the azo-pigments include azo-lake, insoluble azo-pigments, condensed azo-pigments, and chelate azo-pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments, and quinophthalone pigments.

Examples of the dye chelates include basic dye chelates and acid dye chelates.

Examples of the organic pigment include C.I. Pigment Yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 139, 150, 151, 155, 153, 180, 183, 185, and 213; C.I. Pigment Orange 5, 13, 16, 17, 36, 43, and 51; C.I. Pigment Red 1, 2, 3, 5, 17, 22, 23, 31, 38, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (Rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36.

The BET specific surface area of the pigment is not particularly limited, and is preferably 10 $m^2/g$ or greater and 1,500 $m^2/g$ or less, more preferably 20 $m^2/g$ or greater and 600 $m^2/g$ or less, and yet more preferably 50 $m^2/g$ or greater and 300 $m^2/g$ or less.

When a pigment having the desired BET specific surface area is not easily available, the pigment may be subjected to a common size reduction or grinding treatment (e.g., ball mill grinding, jet mill grinding, and ultrasonic treatment) in order to make the particle diameter of the pigment relatively small.

The cumulative 50% volume-based particle diameter $D_{50}$ of the colorant is preferably 50 nm or greater and 350 nm or less in the ink.

The content of the colorant is not particularly limited. The content of the colorant when expressed as a content of the colorant having a solid form is preferably 1% by mass or greater and 15% by mass or less and more preferably 1.5% by mass or greater and 10% by mass or less relative to the whole amount of the ink. When the content of the colorant is 1% by mass or greater, a good ink developability and a good image density are obtained. When the content of the colorant is 15% by mass or less, the ink does not thicken in viscosity and become poorly dischargeable, and a cost advantage is also obtained.

According to the present disclosure, it is optional to use a dye in combination for color tone adjustment. However, it is necessary to use a dye within a range in which weather resistance is not worsened.

The mass ratio between the colorant and the water-soluble organic solvent considerably affects stability of ink discharging from a head, and also affects inhibition of waste ink adherence to the maintenance mechanism of an ink discharging apparatus.

When the content of the colorant expressed as the content of the colorant having a solid form is high but the amount of the water-soluble organic solvent added is low, water evaporation from about the ink meniscus of a nozzle may accelerate and discharging failure may occur.

<Water>

As the water, for example, pure water such as ion-exchanged water, ultrafiltrated water, reverse osmotic water, and distilled water, or ultrapure water may be used.

The content of the water in the ink is not particularly limited, may be appropriately selected in accordance with the intended purpose, and is preferably 10% by mass or greater and 90% by mass or less and more preferably 20% by mass or greater and 60% by mass or less relative to the whole amount of the ink in terms of the drying property and discharging reliability of the ink.

<Surfactant>

It is preferable that the inks further contain a surfactant.

When the ink contains a surfactant, the static surface tension and the dynamic surface tension of the ink can be controlled. The surfactant is not particularly limited. Hydrocarbon-based surfactants, fluorosurfactants, polyether-modified siloxane compounds, acetylene glycol surfactants, and acetylene alcohol surfactants are preferable. It is more preferable to use at least one selected from polyether-modified siloxane compounds, acetylene glycol surfactants, and acetylene alcohol surfactants. Such a surfactant moderates the wetting tendency of the ink on an ink repelling film on a head nozzle plate, reduces discharging failure of the ink due to adherence of the ink to nozzles, and improves discharging stability of the ink. In particular, such a surfactant makes adherence of the ink to the surface of ink repelling films in the nozzles, which is a significant problem if it occurs, less likely to occur, and makes discharging failure of the ink less likely to occur.

Among polyether-modified siloxane compounds, those that are represented by any of General formula (IV) to General formula (VII) below are preferable, and those that do not spoil dispersion stability depending on the kind of the water-dispersible colorant and the combination of organic solvents, and have a low dynamic surface tension, a high permeability, and a high leveling property are particularly preferable.

One of these surfactants may be used alone or two or more of these surfactants may be used as a mixture.

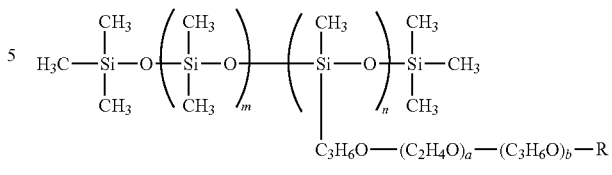

General formula (IV)

[In General formula (IV), R represents a hydrogen atom or an alkyl group containing from 1 through 4 carbon atoms, m represents an integer of from 0 through 23, n represents an integer of from 1 through 10, a represents an integer of from 1 through 23, and b represents an integer of from 0 through 23.]

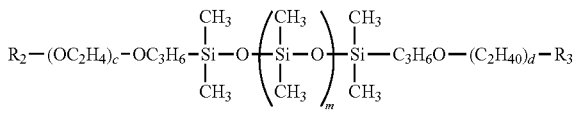

General formula (V)

[In General formula (V), $R_2$ and $R_3$ each independently represent a hydrogen atom or an alkyl group containing from 1 through 4 carbon atoms, m represents an integer of from 1 through 8, and c and d each independently represent an integer of from 1 through 10.]

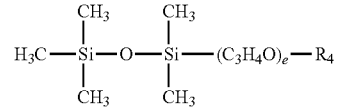

General formula (VI)

[In General formula (VI), $R_4$ represents a hydrogen atom or an alkyl group containing from 1 through 4 carbon atoms, and e represents an integer of from 1 through 8.]

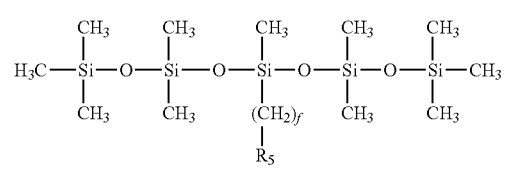

General formula (VII)

[In General formula (VII), $R_5$ represents a polyether group represented by General formula (C) below, and f represents an integer of from 1 through 8.]

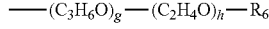

General formula (C)

[In General formula (C), $R_6$ represents a hydrogen atom or an alkyl group containing from 1 through 4 carbon atoms, g represents an integer of from 0 through 23, h represents an integer of from 0 through 23, and there is no case where g and h are 0 at the same time.]

Examples of compounds represented by General formula (IV) include compounds represented by any of Formula (7) to Formula (14) below.

Formula (7)
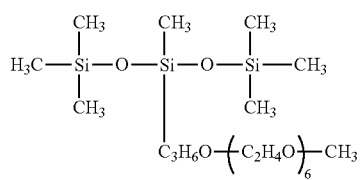

Formula (8)
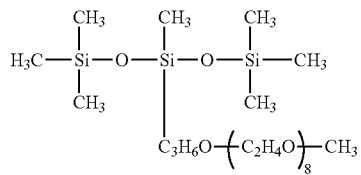

Formula (9)
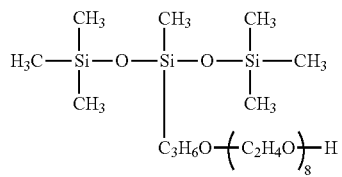

Formula (10)
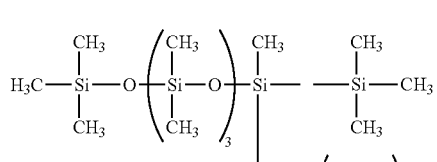

Formula (11)
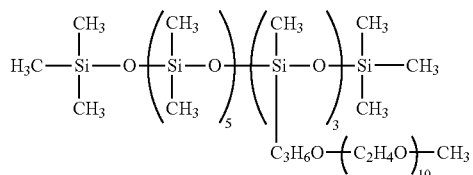

Formula (12)
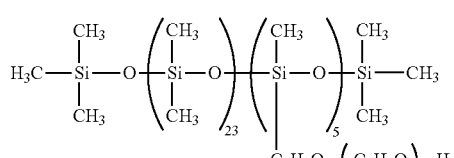

Formula (13)
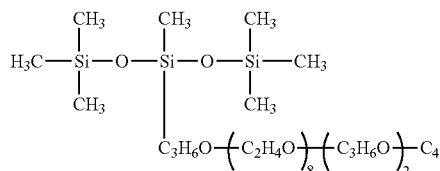

Formula (14)
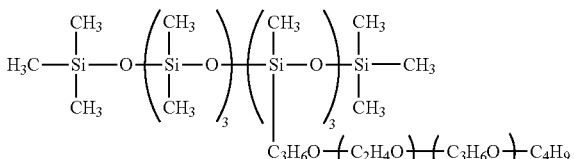

Examples of compounds represented by General formula (V) include a compound represented by Formula (15) below.

Formula (15)
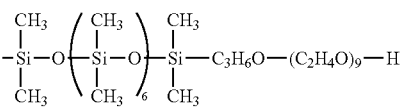

Examples of compounds represented by General formula (VI) include a compound represented by Formula (16) below.

Formula (16)
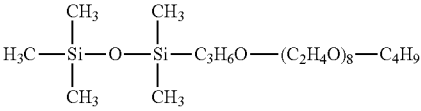

Examples of compounds represented by General formula (VII) include compounds represented by any of Formula (17) to Formula (19) below.

Formula (17)
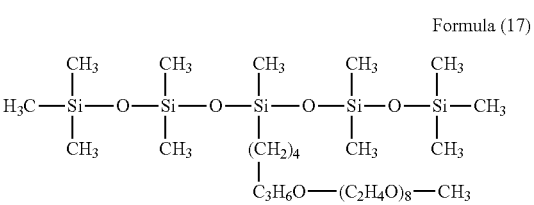

Formula (18)
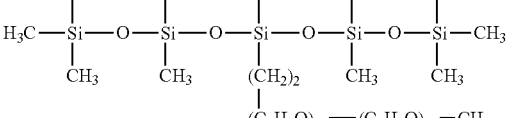

Formula (19)
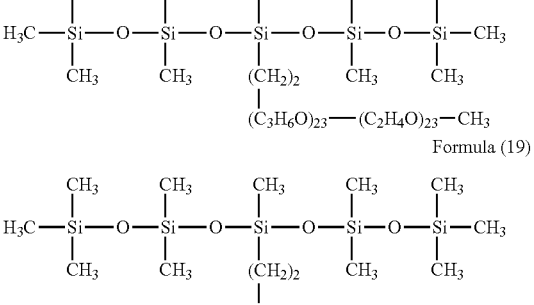

Examples of commercially available polyether-modified siloxane compounds that exhibit an equal or similar effect as that exhibited by the compounds specified above include DOWSIL 71 ADDITIVE, DOWSIL 74 ADDITIVE, DOWSIL 57 ADDITIVE, DOWSIL 8029 ADDITIVE, DOWSIL 8054 ADDITIVE, DOWSIL 8211 ADDITIVE, DOWSIL 8019 ADDITIVE, DOWSIL 8526 ADDITIVE, DOWSIL FZ-2123, and DOWSIL FZ-2191 available from DuPont Toray Specialty Materials K.K.; TSF4440, TSF4441, TSF4445, TSF4446, TSF4450, TSF4452, and TSF4460 available from Momentive Performance Materials Inc.; SILFACE (registered trademark) SAG002, SILFACE (registered trademark) SAG003, SILFACE (registered trademark) SAG005, SILFACE (registered trademark) SAG503A, SILFACE (registered trademark) SAG008, and SILFACE (registered trademark) SJM003 available from Nissin Chemical Co., Ltd.; TEGO (registered trademark) WET KL245, TEGO (registered trademark) WET250, TEGO (registered trademark) WET260, TEGO (registered trademark) WET265, TEGO (registered trademark) WET270, and TEGO (registered trademark) WET280 available from Evonik Industries AG; and BYK-345, BYK-347, BYK-348, BYK-375, and BYK-377 available from Byk Chemie Japan K.K.

Commercially available products may be used as the acetylene glycol surfactants or the acetylene alcohol surfactants. Examples of the commercially available products include SURFYNOL 104, SURFYNOL 104E, SURFYNOL 420, SURFYNOL 440, SURFYNOL 465, SURFYNOL SE, SURFYNOL SEF, SURFYNOL PSA-336, SURFYNOL DF110D, SURFYNOL DF58, OLFINE E1004, OLFINE E1010, OLFINE E1020, OLFINE PD-001, OLFINE PD-002W, OLFINE PD-004, OLFINE PD-005, OLFINE EXP.4001, OLFINE EXP.4200, OLFINE EXP.4123, and OLFINE EXP.4300 (all available from Nissin Chemical Co., Ltd.).

Moreover, for example, fluorosurfactants and silicone-based surfactants other than the polyether-modified siloxane compounds, the acetylene glycol surfactants, and the acetylene alcohol surfactants may be used in combination.

The content of the surfactant is not particularly limited, and is preferably 0.001% by mass or greater and 5% by mass or less and more preferably 0.5% by mass or greater and 3% by mass or less relative to the whole amount of the ink. When the content of the surfactant is 0.001% by mass or greater, a good effect is obtained by addition of the surfactant. However, it is useless to add more than 5% of surfactant, because the effect obtained by adding the surfactant is saturated.

<Other Components>

As needed, various publicly-known additives may further be added to the inks as other components. Examples of the other components include a foam suppressor (defoaming agent), a pH regulator, a preservative/fungicide, a chelating reagent, a corrosion inhibitor, an antioxidant, an ultraviolet absorber, an oxygen absorber, and a light stabilizer.

—Foam Suppressor—

The foam suppressor is added to an ink in a small quantity to be used to suppress foaming of the ink. Foaming represents a phenomenon that a liquid embraces air by forming a thin film. Ink properties such as surface tension and viscosity are related to the formation of bubbles. That is, a liquid having a high surface tension, such as water, does not easily foam because a force that makes the surface area of the liquid as small as possible acts on the liquid. As compared with this, because of the low surface tension, an ink having a high viscosity and a high permeability easily foams, and bubbles thus formed tend to be sustained by the viscous property of the solution and cannot be defoamed easily.

A typical foam suppressor breaks a bubble by reducing the surface tension of the bubble film locally, or another typical foam suppressor that is insoluble in the foaming liquid breaks a bubble by scattering on the surface of the foaming liquid. When a polyether-modified siloxane compound surfactant that has a significantly high effect of reducing the surface tension is used in an ink as a surfactant, it is impossible to reduce the surface tension of a bubble film locally by using a foam suppressor having the former mechanism. However, use of the latter foam suppressor insoluble in the foaming liquid in turn reduces the stability of the ink due to the solution-insolubility of the foam suppressor.

In this regard, a foam suppressor represented by General formula (IX) below does not have so high an effect of reducing the surface tension as that of a polyether-modified siloxane compound surfactant, but has a high compatibility with the surfactant. Hence, it is considered that this foam suppressor is efficiently absorbed into the bubble film, to bring the surface of the bubble film out of balance locally due to the surface tension difference between the surfactant and the foam suppressor and break the bubble.

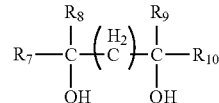

General formula (IX)

[In General formula (IX), $R_7$ and $R_8$ each independently represent an alkyl group containing from 3 through 6 carbon atoms, $R_9$ and $R_{10}$ each independently represent an alkyl group containing 1 or 2 carbon atoms, and n represents an integer of from 1 through 6.]

Examples of the compound represented by General formula (IX) include 2,4,7,9-tetramethyldecane-4,7-diol and 2,5,8,11-tetramethyldodecane-5,8-diol. 2,5,8,11-Tetramethyldodecane-5,8-diol is particularly preferable because it has a high foam suppressing effect and a high compatibility with an ink.

The content percentage of the foam suppressor in the ink is not particularly limited, and is preferably 0.01% by mass or greater and 10% by mass or less and more preferably 0.1% by mass or greater and 5% by mass or less relative to the whole amount of the ink. When the content of the foam suppressor is 0.01% by mass, the foam suppressing effect is obtained. When the content of the foam suppressor is 10% by mass or less, ink properties such as viscosity and particle diameter are not adversely affected, although the foam suppressing effect hits a peak.

—pH Regulator—

The pH regulator is not particularly limited and may be appropriately selected in accordance with the intended purpose so long as the pH regulator can regulate the pH of the ink to which the pH regulator is added to from 7 through 11 without adversely affecting the ink. Examples of the pH regulator include alcohol amines, hydroxides of alkali metal elements, hydroxides of ammonium, phosphonium hydroxides, and carbonates of alkali metals.

When the pH falls beyond the range of from 7 through 11, the amount by which an inkjet head or an ink supplying unit is leached may be high, and troubles such as property change, leakage, and discharging failure of the ink may occur.

Examples of the alcohol amines include diethanol amine, triethanol amine, and 2-amino-2-ethyl-1,3 propanediol.

Examples of the hydroxides of alkali metal elements include lithium hydroxide, sodium hydroxide, and potassium hydroxide.

Examples of the hydroxides of ammonium include ammonium hydroxide and quaternary ammonium hydroxide.

Examples of the phosphonium hydroxides include quaternary phosphonium hydroxide.

Examples of the carbonates of alkali metals include lithium carbonate, sodium carbonate, and potassium carbonate.

It is preferable to use a strongly basic compound as the pH regulator, and it is more preferable to use potassium hydroxide or sodium hydroxide. It is also preferable to use 2-amino-2-ethyl-1,3 propanediol as the pH regulator.

—Preservative/Fungicide—

The preservative/fungicide is not particularly limited. Examples of the preservative/fungicide include sodium dehydroacetate, sodium sorbate, sodium 2-pyridinethiol-1-oxide, sodium benzoate, sodium pentachlorophenol, and 1,2-benzisothizolin-3-one.

—Chelating Reagent—

The chelating reagent is not particularly limited. Examples of the chelating reagent include sodium ethylene diamine tetraacetate, sodium nitrilotriacetate, sodium hydroxyethyl ethylene diamine triacetate, sodium diethylene triamine pentaacetate, and sodium uramil diacetate.

—Corrosion Inhibitor—

The corrosion inhibitor is not particularly limited. Examples of the corrosion inhibitor include acidic sulfites, sodium thiosulfate, ammonium thioglycolate, diisopropyl ammonium nitrite, pentaerythritol tetranitrate, and dicyclohexyl ammonium nitrite.

—Antioxidant—

Examples of the antioxidant include phenol-based antioxidants (including hindered phenol-based antioxidants), amine-based antioxidants, sulfur-based antioxidants, and phosphorus-based antioxidants.

—Ultraviolet Absorber—

Examples of the ultraviolet absorber include benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

<Production of Inks>

It is possible to produce the inks according to the present disclosure through a stirring/mixing step of dispersing or dissolving the anionic compound, the organic solvent, and the water, and the colorant and the other components that may be added as needed in an aqueous medium and stirring and mixing the resulting product, and a step of warming the obtained mixture at 40° C. or higher and lower than 70° C. for 6 hours or longer. The stirring and mixing can be performed with, for example, a sand mill, a homogenizer, a ball mill, a paint shaker, and an ultrasonic disperser, or a stirrer using a typical stirring blade, a magnetic stirrer, and a high-speed disperser.

<Properties of Inks>

Properties of the inks according to the present disclosure are not particularly limited and may be appropriately selected in accordance with the intended purpose.

When the static surface tension of the ink at 25° C. is 20 mN/m or higher and the dynamic surface tension of the ink at 25° C. for a bubble lifetime of 15 msec according to the maximum bubble pressure technique is 40 mN/m or lower, there is an advantage that the ink can be ensured a sufficient wetting tendency on print media, and can also be ensured significantly high stability properties such as discharging stability because the ink does not readily wet a nozzle plate of an inkjet head on the other hand.

The static surface tension of the ink at 25° C. can be measured using an automatic surface tensiometer (e.g., DY-300, available from Kyowa Interface Science Co., Ltd.) according to a plate method (Wilhelmy method). The temperature of 25° C. is not the temperature of a print medium but is the temperature of the ink.

The dynamic surface tension of the ink at 25° C. for a bubble lifetime of 15 msec according to the maximum bubble pressure technique can be measured with a portable dynamic surface tensiometer (e.g., SITA DYNOTESTER, available from SITA).

The viscosity of the ink at 25° C. is preferably 5 mPa·s or higher and 25 mPa·s or lower and more preferably 6 mPa·s or higher and 20 mPa·s or lower. When the viscosity of the ink is 5 mPa·s or higher, an effect of improving image density and text quality can be obtained. When the viscosity of the ink is 25 mPa·s or lower, ink dischargibility can be secured.

The viscosity can be measured with, for example, a viscometer (RE-85L, available from Toki Sangyo Co., Ltd.) at 25° C.

The pH of the ink is preferably from 8 through 10 and more preferably from 8.5 through 10 in order to secure ink storage stability.

<Ink Storage Container>

The inks according to the present disclosure may be used by being stored in a container such as an ink cartridge. Examples of the ink storage container include an ink pack formed of an aluminum laminated film or a vapor-deposited aluminum film, and a plastic container (ink cartridge) into which, for example, carbon black is kneaded.

<Print Medium>

Using the set of inkjet inks according to the present disclosure, it is possible to form very good images on textiles or cloths.

The set of inkjet inks according to the present disclosure can also be used on other print media than textiles or cloths, and can be used on, for example, plain paper, gloss paper, special paper, cloths, films, OHP sheets, and general-purpose print paper.

The cloth medium will be described below.

<<Cloth>>

Cloth represents products including fibers, and products of fibers in the form of woven goods, knitted goods, and non-woven fabrics.

The fibers constituting cloth include synthetic fibers, and may include fibers other than synthetic fibers as needed. The reason why synthetic fibers are used as the fibers constituting the cloth will be described below.

In general, synthetic fibers such as polyester fibers have scarce voids in the fibers unlike natural fibers such as cotton fibers. Hence, when an image is formed on cloth including synthetic fibers by application of an ink, water-soluble organic solvents contained in the ink are not readily absorbed into the fibers and tend to be kept in the image. If the water-soluble organic solvents are kept in the image, the robustness of the image is reduced. If the content of the water-soluble organic solvents in the ink is reduced in order to maintain the robustness of the image, the decapping smoothness of the ink is reduced.

As compared, according to the present disclosure, an ink is applied to a region to which the pre-processing fluid is applied. Therefore, even if the fibers constituting the cloth are synthetic fibers, water-soluble organic solvents contained in the ink are absorbed into the compound that can flocculate an anionic compound and is contained in the pre-processing fluid, and the water-soluble organic solvents are inhibited from being kept in the image. As a result, the robustness of the image is improved.

Examples of synthetic fibers include fibers of polyester, polyamide, acrylic, polyolefin, polyvinyl alcohol, polyvinyl chloride, polyurethane, and polyimide. Among these kinds of synthetic fibers, polyester fibers are preferable.

As the fibers, fibers containing a biodegradable polyester composition may also be used. A biodegradable polyester composition contains, for example, biodegradable aliphatic-aromatic polyester or polylactic acid, and may further contain an organic filler or an inorganic filler as needed.

Examples of biodegradable aliphatic-aromatic polyester include polybutylene adipate terephthalate (PBAT), polybutylene succinate terephthalate (PBST), and polybutylene sebacate terephthalate (PBSeT). Examples of the organic filler include natural starch, plasticized starch, modified starch, natural fibers, and wood filling. Examples of the inorganic filler include talc powder, montmorillonite, kaolin, chalk, calcium carbonate, graphite, plaster, conductive carbon black, calcium chloride, iron oxide, dolomite, silica, wollastonite, titanium dioxide, silicate, mica, glass fibers, and mineral fibers.

The set of inkjet inks according to the present disclosure can be suitably used in various printing apparatuses of an inkjet printing type, such as printers, facsimile machines, copiers, printer/facsimile/copier multifunction peripherals, and three-dimensional object producing apparatuses.

According to the present disclosure, a printing apparatus represents an apparatus capable of discharging, for example, inks and various processing fluids to a print medium and a printing method using the apparatus. The print medium represents an article to which the inks or the various processing fluids can be attached at least temporarily.

(Inkjet Image Forming Method and Inkjet Image Forming Apparatus)

An inkjet image forming method according to the present disclosure includes a step 1 of applying a pre-processing fluid containing at least water, a compound that flocculates an anionic compound, and at least one emulsified sizing agent to at least a region, on which an image is to be formed, of a print medium, before forming an image on the print medium using an ink (hereinafter, the step may be referred to as a "pre-processing fluid applying step"), and a step 2 of inkjet-applying an ink to the region, to which the pre-processing fluid is applied, of the print medium obtained in the pre-processing fluid applying step (hereinafter, the step may be referred to as an "ink applying step").

The inkjet image forming method according to the present disclosure may include a step 3 of inkjet-applying a color ink to an ink of an image formed with a white ink (hereinafter, the step may be referred to as a "color ink applying step on a white ink"), and may include a step 4 of heating and drying a cloth after the step 1 or the step 3 (hereinafter, the step may be referred to as a "heating/drying step").

An inkjet image forming apparatus according to the present disclosure includes a pre-processing fluid storage unit, an ink storage unit, a pre-processing fluid applying unit, and an ink applying unit, and further includes other units such as a heating/drying unit as needed.

The inkjet image forming method according to the present disclosure is suitably performed by the inkjet image forming apparatus according to the present disclosure. Descriptions of the inkjet image forming apparatus according to the present disclosure will be provided below collectively with descriptions of the inkjet image forming method according to the present disclosure.

The pre-processing fluid and the inks used in the inkjet image forming method according to the present disclosure and the inkjet image forming apparatus according to the present disclosure are those that are specified for the set of inkjet inks according to the present disclosure. Therefore, detailed descriptions of the pre-processing fluid and the inks will be skipped. The cloth specified above is preferable as the print medium used in the inkjet image forming method according to the present disclosure.

<Pre-Processing Fluid Storage Unit>

The pre-processing fluid storage unit is a unit configured to a pre-processing fluid.

The pre-processing fluid to be stored in the pre-processing fluid storage unit is the pre-processing fluid included in the set of inkjet inks according to the present disclosure.

<Ink Storage Unit>

The ink storage unit is a unit configured to store an ink.

The ink to be stored in the ink storage unit is the white ink or the color ink included in the set of inkjet inks according to the present disclosure. Accordingly, the number of ink storage units in the inkjet image forming apparatus may be one or a plural number.

<<Ink Cartridge>>

An ink cartridge may be used as the pre-processing fluid storage unit and the ink storage unit. The ink cartridge is an article having stored the set of inkjet inks according to the present disclosure, and includes the set of inkjet inks and a container, and further includes other components as needed.

The ink cartridge is advantageous because users can avoid direct contact with the ink during operations such as replacement of the ink, so that fingers and clothes are prevented from contamination, and because inclusion of foreign matters such as dust in the ink can be prevented.

The ink cartridge may store the set of inkjet inks collectively, or may store each of the pre-processing fluid, the white ink, and the color ink independently. When the set of inkjet inks includes the pre-processing fluid, the white ink, and a plurality of color inks, the ink cartridge may store the pre-processing fluid, the white ink, and the plurality of color inks collectively, or may store each of the pre-processing fluid, the white ink, and the plurality of color inks independently.

The container is not particularly limited. For example, the shape, structure, size, and material of the container may be appropriately selected in accordance with the intended purpose. For example, a container such as an ink bag formed of, for example, aluminum laminate film or resin film is preferable.

The method for producing the ink cartridge is not particularly limited. It is possible to produce the ink cartridge by employing a publicly-known method appropriately.

For example, it is preferable that the ink cartridge has a cartridge case (e.g., a plastic case) in which the set of inkjet inks stored in the container such as the ink bag is further stored, and are used while being mountably or demountably mounted on the inkjet image forming apparatus. This can simplify ink replenishment or replacement and can improve the operation efficiency.

<Step 1: Pre-Processing Fluid Applying Step and Pre-Processing Fluid Applying Unit>

The pre-processing fluid applying step as the step 1 is a step of applying the pre-processing fluid to at least a region, on which an image is to be formed, of a print medium.

The pre-processing fluid applying unit is a unit configured to apply the pre-processing fluid to at least a region, on which an image is to be formed, of a print medium.

The pre-processing fluid applying step is suitably performed by the pre-processing fluid applying unit.

Examples of the pre-processing fluid applying method in the inkjet image forming method and the inkjet image forming apparatus according to an embodiment include a method of applying the pre-processing fluid to a surface of a print medium uniformly using a discharging head. An inkjet method is preferable.

The pre-processing fluid applying method is not particularly limited so long as the pre-processing fluid applying method can apply the pre-processing fluid to a surface of a print medium uniformly. Examples of the pre-processing fluid applying method also include a blade coating method, a spray coating method, a gravure coating method, a gravure offset coating method, a bar coating method, a roll coating method, a knife coating method, an air knife coating method, a comma coating method, a U-comma coating method, an AKKU coating method, a smoothing coating method, a microgravure coating method, a reverse roll coating method, a four or five-roll coating method, a dip coating method, a curtain coating method, a slide coating method, and a die coating method.

The pre-processing fluid applying step may be performed on a print medium of which surface is sufficiently dry, or may be performed on a print medium being dried. As needed, the print medium to which the pre-processing fluid is applied may be subjected to a drying step. In this case, the print paper can be dried with a roll heater, a drum heater, or hot air.

The amount of the pre-processing fluid attached wet on a print medium in the pre-processing fluid applying step is not particularly limited, may significantly vary depending on the kind of the print medium, and is preferably in the range of from 0.1 $g/m^2$ through 500 $g/m^2$ and more preferably in the range of from 1.0 $g/m^2$ through 400.0 $g/m^2$. When the amount of the pre-processing fluid attached wet on the print medium is low, such as less than 0.1 $g/m^2$, almost no improvement in the image qualities (brightness by Hunter, image density, saturation, anti-beading, and anti-color bleed) may be obtained. When the amount of the pre-processing fluid attached wet on the print medium is greater than 500 $g/m^2$, the pre-processing fluid has a poor drying property, and there is also a cost disadvantage.

<Step 2: Ink Applying Step and Ink Applying Unit>

The ink applying step as the step 2 is a step of inkjet-applying the ink to the region, to which the pre-processing fluid is applied, of the print medium obtained in the step 1.

The ink applying unit is a unit configured to inkjet-applying the ink to the region, to which the pre-processing fluid is applied, of the print medium.

The ink applying step is suitably performed by the ink applying unit.

The ink applied to the print medium in the ink applying step and by the ink applying unit may be a white ink or may be a color ink.

The amount of the ink attached wet on the print medium in the ink applying step and by the ink applying unit is not particularly limited and may significantly vary depending on the print medium.

When the ink is a white ink, the amount of the ink attached wet on the print medium is preferably 1 $g/m^2$ or greater and 500 $g/m^2$ or less and more preferably 5 $g/m^2$ or greater and 400 $g/m^2$ or less in terms of improvement in image qualities and improvement in a drying property. When the ink is a white ink and the cloth is used as the print medium, the amount of the ink attached wet on the print medium is preferably 50 $g/m^2$ or greater and 500 $g/m^2$ or less, more preferably 100 $g/m^2$ or greater and 400 $g/m^2$ or less, and yet more preferably 150 $g/m^2$ or greater and 300 $g/m^2$ or less.

When the ink is a color ink, the amount of the ink attached wet on the print medium is preferably 1 $g/m^2$ or greater and 50 $g/m^2$ or less and more preferably 5 $g/m^2$ or greater and 30 $g/m^2$ or less in terms of improvement in image qualities and improvement in a drying property. When the ink is a color ink and the cloth is used as the print medium, the amount of the ink attached wet on the print medium is preferably 5 $g/m^2$ or greater and 50 $g/m^2$ or less and more preferably 10 $g/m^2$ or greater and 30 $g/m^2$ or less.

<Step 3: Color Ink Applying Step on a White Ink>

The color ink applying step on a white ink as the step 3 is a step performed after the step 2, and is a step of inkjet-applying a color ink on a white ink when the ink used in the step 2 is the white ink.

In the color ink applying step on a white ink, the white ink is suitably applied by the ink applying unit. In this case, the ink applying unit may be referred to as "a white ink applying unit" configured to inkjet-apply the white ink to the region, to which the pre-processing fluid is applied, of the print medium.

According to this aspect, it is preferable that the inkjet image forming apparatus further includes "a color ink applying unit" configured to apply a color ink. As a result, the color ink is inkjet-applied to the white ink applied by the white ink applying unit. The color ink applying unit is implemented in the same manner as the ink applying unit except that the color ink applying unit is configured to apply a color ink to the white ink instead of the ink applying unit's applying the ink to the region, to which the pre-processing fluid is applied.

The amount of the color ink attached wet on the print medium in the color ink applying step on a white ink is not particularly limited, and an amount attached that is the same as the amount of the color ink attached wet in the step 2 is applicable.

<Step 4: Heating/Drying Step and Heating/Drying Unit>

The heating/drying step as the step 4 can be performed, for example, before, during, and after printing. It is preferable that the heating/drying step is a step performed after the step 2, and is a step of heating and drying the print medium to which the ink is applied. When the inkjet image forming method includes the step 3, it is preferable that the heating/drying step be performed after the step 3.

The heating/drying unit is a unit configured to heat and dry the print medium to which the ink is applied by the ink applying unit.

The heating/drying step is suitably performed by the heating/drying unit

The heating/drying unit is not particularly limited. Examples of the heating/drying unit include a unit configured to heat and dry a surface of the print medium on which the image is printed and a back surface of the print medium. Specific examples of the heating/drying unit include an infrared drier, a microwave drier, a roll heater, a drum heater, and hot air.

The inkjet image forming apparatus may further optionally include a device relating to feeding, conveying, and ejecting the print medium and other devices referred to as a post-processing device in addition to the head portion to discharge the pre-processing fluid and the ink. In the inkjet image formation, it is possible to apply the pre-processing fluid not only by discharging the pre-processing fluid from the head but also by applying the pre-processing fluid using a device referred to as a pre-processing device.

In addition, the inkjet image forming method and the inkjet image forming apparatus are not limited to those producing merely meaningful visible images such as texts and figures with the ink. For example, the inkjet image forming method and the inkjet image forming apparatus can produce patterns like geometric design and 3D images.

In addition, the inkjet image forming apparatus includes both a serial type apparatus in which the liquid discharging head is caused to move and a line type apparatus in which the liquid discharging head is not moved, unless otherwise specified.

Furthermore, in addition to the desktop type, this inkjet image forming apparatus includes a wide-type inkjet image forming apparatus capable of printing images on a large print medium such as A0, and a continuous printer capable of using continuous paper wound up in a roll form as print media.

Next, with reference to FIG. 1 and FIG. 2, the inkjet image forming apparatus according to the present disclosure will be described specifically. However, the present disclosure is not limited to the following description.

Figure 2:
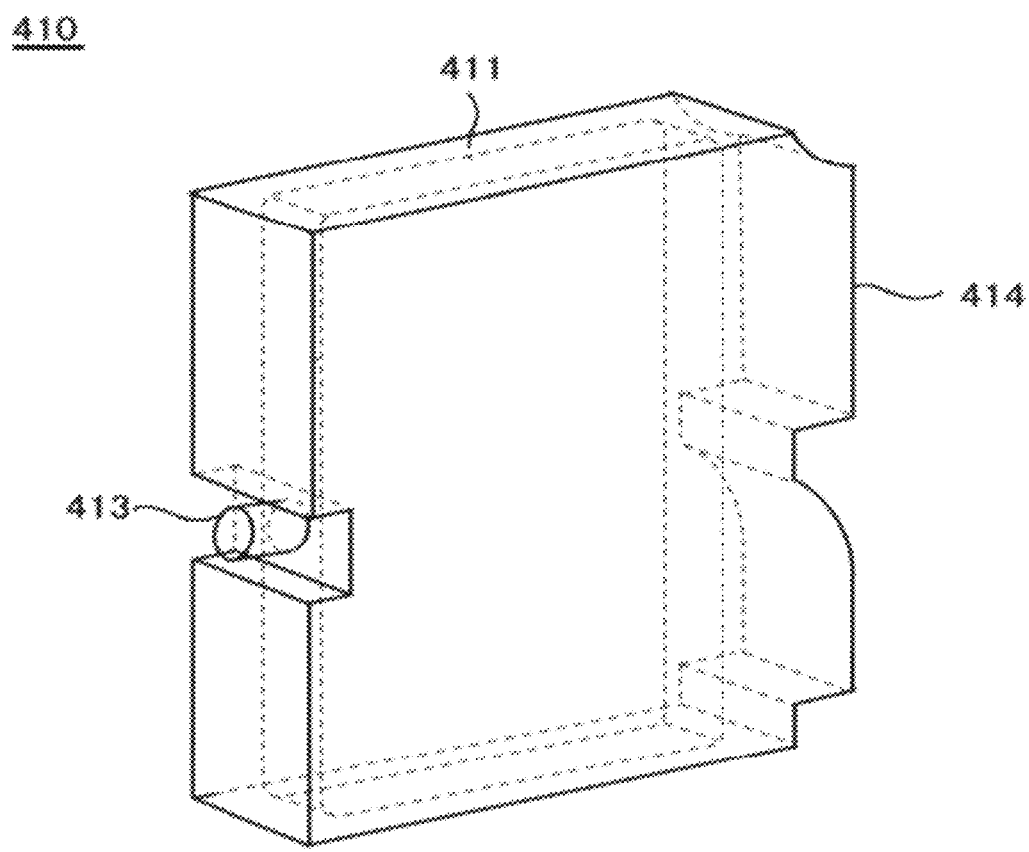
FIG. 2 is a schematic oblique view illustrating an example of a storage unit of an inkjet image forming apparatus of the present disclosure.

FIG. 1 is a schematic oblique view illustrating an example of an inkjet image forming apparatus according to the present disclosure. FIG. 2 is a schematic oblique view illustrating an example of the storage unit (a pre-processing fluid storage unit, a white ink storage unit, or a color ink storage unit) of the inkjet image forming apparatus according to the present disclosure.

The inkjet image forming apparatus 400 illustrated in FIG. 1 is an inkjet image forming apparatus including a serial-type inkjet discharging head. A mechanical unit 420 is disposed in an exterior 401 of the inkjet image forming apparatus 400. A storage 411 in each of a pre-processing fluid storage unit 410p for the pre-processing fluid, a white ink storage unit 410w for the white ink, a black ink storage unit 410k for a black ink, and a cyan ink storage unit 410c for a cyan ink is made of a packing member such as aluminum laminate film. The storage 411 is accommodated in, for example, a plastic housing case 414. As a result, each storage unit 410 is used as an ink cartridge.

A cartridge holder 404 is disposed on the rear side of the opening when a cover 401c of the main body of the inkjet image forming apparatus 400 is opened. Each storage unit 410 (p, w, k, and c) is detachably attached to the cartridge holder 404. As a result, a discharging outlet 413 of each storage unit 410 (p, w, k, and c) is communicated with an inkjet discharging head 434 via a supplying tube 436 so that the pre-processing fluid and each ink can be discharged from the inkjet discharging head 434 to a print medium.

The inkjet image forming apparatus 400 illustrated in FIG. 1 applies the pre-processing fluid to a print medium by an inkjet method. However, the method for applying the pre-processing fluid is not limited to this, and the applying methods specified above may be used.

Moreover, image forming, recording, printing, etc. in the present disclosure represent the same meaning.

The terms print media, media, print targets, and base materials may be used interchangeably.

EXAMPLES

The present disclosure will be described below by way of Examples. The present disclosure should not be construed as being limited to these Examples.

In the following description, "part" represents "part by mass" and "%" represents "% by mass" unless otherwise specified.

Preparation Example 1

—Preparation of Surface-Reformed Black Pigment Dispersion—

BLACK PEARLS (registered trademark) 1000 obtained from Cabot Corporation (carbon black having a BET specific surface area of 343 $m^2/g$ and a dibutyl phthalate absorption (DBPA) of 105 mL/100 g) (100 g), sulfanilic acid (100 mmol), and ion-exchanged highly pure water (1 L) were mixed at room temperature using a Silverson mixer (6,000 rpm).

Next, nitric acid (100 mmol) was added to the obtained slurry. Thirty minutes later, sodium nitrite (100 mmol) dissolved in ion-exchanged highly pure water (10 mL) was slowly added to the resulting product. The resulting product was warmed to 60° C. while being stirred, and allowed to react for 1 hour, to obtain a reformed pigment in which sulfanilic acid was added to carbon black.

Next, the pH of the obtained reformed pigment was regulated to 9 with a 10% tetrabutyl ammonium hydroxide solution (methanol solution), to obtain a reformed pigment dispersion 30 minutes later. Next, this dispersion and ion-exchanged highly pure water were subjected to ultrafiltration using a dialysis membrane, and further subjected to ultrasonic dispersion treatment, to obtain [Surface-reformed black pigment dispersion] having a solid pigment content of 20%.

The surface treatment level of the obtained [Surface-reformed black pigment dispersion] was 0.75 mmol/g. The cumulative 50% volume-based particle diameter $D_{50}$ of the obtained [Surface-reformed black pigment dispersion] measured with a granularity distribution analyzer (obtained from Nikkiso Co., Ltd., NANOTRAC UPA-EX150) was 120 nm.

Preparation Example 2

—Preparation of Surface-Reformed Magenta Pigment Dispersion—

A pigment dispersion SMART MAGENTA 3122BA obtained from SENSIENT Technologies Corporation (surface-treated Pigment Red 122 dispersion, having a solid pigment content of 14.5%) (1 kg) was acidified out with a 0.1 N HCl aqueous solution.

Next, the pH of the resulting product was regulated to 9 with a 10% tetraethyl ammonium hydroxide aqueous solution. Thirty minutes later, a reformed pigment dispersion was obtained. The reformed pigment dispersion containing the pigment that was bound with at least one aminobenzoic acid group or an aminobenzoic acid tetraethyl ammonium salt and ion-exchanged highly pure water were subjected to ultrafiltration using a dialysis membrane, and further subjected to ultrasonic dispersion treatment, to obtain [Surface-reformed magenta pigment dispersion] having a solid pigment content of 20%.

The cumulative 50% volume-based particle diameter $D_{50}$ of the obtained [Surface-reformed magenta pigment dispersion] measured with a granularity distribution analyzer (obtained from Nikkiso Co., Ltd., NANOTRAC UPA-EX150) was 104 nm.

Preparation Example 3

—Preparation of Surface-Reformed Cyan Pigment Dispersion—

A pigment dispersion SMART CYAN 3154BA obtained from SENSIENT Technologies Corporation (surface-treated Pigment Blue 15:4 dispersion, having a solid pigment content of 14.5%) (1 kg) was acidified out with a 0.1 N HCl aqueous solution.

Next, the pH of the resulting product was regulated to 9 with a 40% benzyl trimethyl ammonium hydroxide solution (methanol solution). Thirty minutes later, a reformed pigment dispersion was obtained. The reformed pigment dispersion containing the pigment that was bound with at least one aminobenzoic acid group or an aminobenzoic acid benzyl trimethyl ammonium salt and ion-exchanged highly pure water were subjected to ultrafiltration using a dialysis membrane, and further subjected to ultrasonic dispersion treatment, to obtain [Surface-reformed cyan pigment dispersion] having a solid pigment content of 20%.

The cumulative 50% volume-based particle diameter $D_{50}$ of the obtained [Surface-reformed cyan pigment dispersion] measured with a granularity distribution analyzer (obtained from Nikkiso Co., Ltd., NANOTRAC UPA-EX150) was 116 nm.

Preparation Example 4

—Preparation of Surface-Reformed Yellow Pigment Dispersion—

The pH of a pigment dispersion SMART YELLOW 3074BA (surface-treated Pigment Yellow 74 dispersion, having a solid pigment content of 14.5%) (1 kg) was regulated to 9 with a 10% tetrabutyl ammonium hydroxide solution (methanol solution), to obtain a reformed pigment dispersion thirty minutes later. The reformed pigment dispersion containing the pigment that was bound with at least one aminobenzoic acid group or an aminobenzoic acid tetrabutyl ammonium salt and ion-exchanged highly pure water were subjected to ultrafiltration using a dialysis membrane, and further subjected to ultrasonic dispersion treatment, to obtain [Surface-reformed yellow pigment dispersion] having a solid pigment content of 20%.

The cumulative 50% volume-based particle diameter $D_{50}$ of the obtained [Surface-reformed yellow pigment dispersion] measured with a granularity distribution analyzer (obtained from Nikkiso Co., Ltd., NANOTRAC UPA-EX150) was 145 nm.

Preparation Example 5

—Preparation of Polymer Solution A—

A 1 L flask equipped with a mechanical stirrer, a thermometer, a nitrogen gas introducing tube, a reflux condenser, and a dropping funnel was internally purged with a nitrogen gas sufficiently. Subsequently, in the flask, styrene (11.2 g), acrylic acid (2.8 g), lauryl methacrylate (12.0 g), polyethylene glycol methacrylate (4.0 g), styrene macromer (4.0 g), and mercapto ethanol (0.4 g) were mixed and subjected to temperature elevation to 65° C. Next, a mixed solution of styrene (100.8 g), acrylic acid (25.2 g), lauryl methacrylate (108.0 g), polyethylene glycol methacrylate (36.0 g), hydroxylethyl methacrylate (60.0 g), styrene macromer (36.0 g), mercapto ethanol (3.6 g), azobis methyl valeronitrile (2.4 g), and methyl ethyl ketone (18 g) was dropped into the flask in 2.5 hours. After dropping, a mixed solution of azobis methyl valeronitrile (0.8 g) and methyl ethyl ketone (18 g) was dropped into the flask in 0.5 hours.

The resulting product was stirred at 65° C. for 1 hour. Subsequently, azobis methyl valeronitrile (0.8 g) was added to the resulting product, which was further stirred for 1 hour. After the reaction ended, methyl ethyl ketone (364 g) was added into the flask, to obtain [Polymer solution A] (800 g) having a concentration of 50%.

Preparation Example 6

—Preparation of Magenta Pigment-Containing Polymer Particle Dispersion Liquid—

[Polymer solution A] (28 g), C.I. Pigment Red 122 (42 g), a 1 mol/L potassium hydroxide aqueous solution (13.6 g), methyl ethyl ketone (20 g), and ion-exchanged water (13.6 g) were sufficiently stirred, and subsequently kneaded using a roll mill. The obtained paste was added to pure water (200 g), and the resulting product was sufficiently stirred. Subsequently, methyl ethyl ketone and water were evaporated from the resulting product using an evaporator, and the resulting dispersion liquid was subjected to pressure filtration using a polyvinylidene fluoride membrane filter having an average pore diameter of 5.0 micrometers in order to remove coarse particles. In this way, [Magenta pigment-containing polymer particle dispersion liquid] having a pigment content of 15% and a solid content of 20% was obtained.

The cumulative 50% volume-based particle diameter $D_{50}$ of the obtained [Magenta pigment-containing polymer particle dispersion liquid] measured with a granularity distribution analyzer (obtained from Nikkiso Co., Ltd., NANOTRAC UPA-EX150) was 127 nm.

Preparation Example 7

—Preparation of Cyan Pigment-Containing Polymer Particle Dispersion Liquid—

[Cyan pigment-containing polymer particle dispersion liquid] was prepared in the same manner as in Preparation example 6, except that C.I. Pigment Red 122 used as a pigment in Preparation example 6 was changed to a phthalocyanine pigment (C.I. Pigment Blue 15:3).

The cumulative 50% volume-based particle diameter $D_{50}$ of the polymer particles contained in the obtained [Cyan pigment-containing polymer particle dispersion liquid] was measured with a granularity distribution analyzer (obtained from Nikkiso Co., Ltd., NANOTRAC UPA-EX150), and was 93 nm.

Preparation Example 8

—Preparation of Yellow Pigment-Containing Polymer Particle Dispersion Liquid—

[Yellow pigment-containing polymer particle dispersion liquid] was prepared in the same manner as in Preparation example 6, except that C.I. Pigment Red 122 used as a pigment in Preparation example 6 was changed to a bisazo yellow pigment (C.I. Pigment Yellow 155).

The cumulative 50% volume-based particle diameter $D_{50}$ of the polymer particles contained in the obtained [Yellow pigment-containing polymer particle dispersion liquid] was measured with a granularity distribution analyzer (obtained from Nikkiso Co., Ltd., NANOTRAC UPA-EX150), and was 76 nm.

Preparation Example 9

—Preparation of Carbon Black Pigment-Containing Polymer Particle Dispersion Liquid—

[Carbon black pigment-containing polymer particle dispersion liquid] was prepared in the same manner as in Preparation example 6, except that C.I. Pigment Red 122 used as a pigment in Preparation example 6 was changed to carbon black (obtained from Degussa AG, FW100).

The cumulative 50% volume-based particle diameter $D_{50}$ of the polymer particles contained in the obtained [Carbon black pigment-containing polymer particle dispersion liquid] was measured with a granularity distribution analyzer (obtained from Nikkiso Co., Ltd., NANOTRAC UPA-EX150), and was 104 nm.

Preparation Example 10

—Preparation of Polymer-Dispersed White Pigment Dispersion Liquid—

A DISPERBYK-2081 (obtained from BYK Japan KK) copolymer solution (55.6 g), titanium oxide (TIT ONE R-25, obtained from Sakai Chemical Industry Co., Ltd.) (517 g), β-methoxy-N,N-dimethyl-propionamide (50 g), and ion-exchanged water (377.4 g) were sufficiently stirred, and subsequently subjected to dispersion treatment using a bead mill (DYNO mill) until the cumulative 50% volume-based particle diameter $D_{50}$ became 300 nm or less. In order to remove coarse particles, the obtained dispersion liquid was subjected to pressure filtration using a polyvinylidene fluoride membrane filter having an average pore diameter of 5.0 micrometers, to obtain [Polymer-dispersed white pigment dispersion liquid] having a white pigment content of 50%.

The cumulative 50% volume-based particle diameter $D_{50}$ of the pigment particles contained in the obtained [Polymer-dispersed white pigment dispersion liquid] was measured with a granularity distribution analyzer (obtained from Nikkiso Co., Ltd., NANOTRAC UPA-EX150), and was 283 nm.

Preparation Example 11

Preparation Example of Resin Particles

<Preparation of Acrylic-Silicone Polymer Particles>

A 1 L flask equipped with a mechanical stirrer, a thermometer, a nitrogen gas introducing tube, a reflux condenser, and a dropping funnel was internally purged with a nitrogen gas sufficiently. Subsequently, in the flask, ion-exchanged water (350 g) and LATEMUL S-180 (obtained from Kao Corporation, a reactive anionic surfactant) (8.0 g) were mixed and subjected to temperature elevation to 65° C.

Next, t-butyl peroxobenzoate (3.0 g) serving as a reaction initiator and sodium isoascorbate (1.0 g) were added to the resulting product. Five minutes later, a mixture of methyl methacrylate (45 g), methacrylic acid-2-ethyl hexyl (160 g), acrylic acid (5 g), butyl methacrylate (45 g), cyclohexyl methacrylate (30 g), vinyl triethoxysilane (15 g), LATEMUL S-180 (8.0 g), and ion-exchanged water (340 g) was dropped into the resulting product in 3 hours.

Next, the resulting product was heated and aged at 80° C. for 2 hours, and subsequently cooled to normal temperature. Then, the pH of the resulting product was regulated to from 7 through 8 with sodium hydroxide.

Next, ethanol was evaporated from the resulting product using an evaporator, and the water content in the resulting product was adjusted, to obtain [Acrylic-silicone polymer particles] (730 g) having a solid content of 40%. The cumulative 50% volume-based particle diameter $D_{50}$ of the polymer particles contained in the dispersion was measured with a granularity distribution analyzer (obtained from Nikkiso Co., Ltd., NANOTRAC UPA-EX150), and was 125 nm.

<Production of Inks>

Inks were produced in the manner described below.

(Ink 1)

2-Ethyl-1,3-hexanediol (2.00 parts), glycerin (27.00 parts), 3-methyl-1,3-butanediol (5.00 parts), 2,5,8,11-tetramethyldodecane-5,8-diol (0.50 parts), and SILFACE (registered trademark) SAG503A (0.40 parts by mass) were added into a container equipped with a stirrer, and mixed and stirred for 30 minutes.

Next, a preservative/fungicide (obtained from Avecia Pharmaceuticals, PROXEL GXL) (0.05 parts), 2-amino-2-ethyl-1,3-propanediol (0.20 parts), [Magenta pigment-containing polymer particle dispersion liquid] of Preparation example 6 (26.67 parts), a polyurethane dispersion TAKELAC W-6110 (35.93 parts), and highly pure water (balance for the total of 100 parts) were added to the resulting product. The resulting product was mixed and stirred for 60 minutes.

Next, the obtained mixture was subjected to pressure filtration using a polyvinylidene fluoride membrane filter having an average pore diameter of 1.2 micrometers, to remove coarse particles and dust, to obtain [Ink 1].

(Ink 2)

2-Ethyl-1,3-hexanediol (2.00 parts), glycerin (27.50 parts), 3-methyl-1,3-butanediol (5.00 parts), 2,5,8,11-tetramethyldodecane-5,8-diol (0.50 parts), and SILFACE (registered trademark) SAG503A (0.40 parts by mass) were added into a container equipped with a stirrer, and mixed and stirred for 30 minutes.

Next, a preservative/fungicide (obtained from Avecia Pharmaceuticals, PROXEL GXL) (0.05 parts), 2-amino-2-ethyl-1,3-propanediol (0.20 parts), [Cyan pigment-containing polymer particle dispersion liquid] of Preparation example 7 (26.67 parts), a polyurethane dispersion TAKELAC W-6110 (35.93 parts), and highly pure water (balance for the total of 100 parts) were added to the resulting product. The resulting product was mixed and stirred for 60 minutes.

Next, the obtained mixture was subjected to pressure filtration using a polyvinylidene fluoride membrane filter having an average pore diameter of 1.2 micrometers, to remove coarse particles and dust, to obtain [Ink 2].

(Inks 3 to 15)

In the same manner as for the ink 1 and the ink 2, an organic solvent, a surfactant, and a defoaming agent presented in the respective fields of Tables 1-1 to 1-5 for inks 3 to 15 were mixed and stirred, a preservative/fungicide, a pH regulator, and a colorant (pigment dispersion) were then mixed and stirred with the resulting product, and a water-dispersible polyurethane resin or resin particles were further mixed and stirred with the resulting product. The obtained mixture was subjected to pressure filtration using a polyvinylidene fluoride membrane filter having an average pore diameter of 1.2 micrometers, to remove coarse particles and dust, to obtain [Ink 3] to [Ink 15].

The compositions of [Ink 1] to [Ink 15] are presented in Tables 1-1 to 1-5.

The details of, for example, abbreviations in Tables 1-1 to 1-5 are as follows.

—Resin—

SUPERFLEX 300: polyurethane dispersion, having a solid content of 33.0% and a glass transition temperature (Tg) of −42° C., obtained from DKS Co., Ltd.

TAKELAC W-6110: polyurethane dispersion, having a solid content of 33.4% and a glass transition temperature (Tg) of −20° C., obtained from Mitsui Chemicals, Inc.

—Surfactant—

SILFACE (registered trademark) SAG503A: polyether-modified siloxane compound, obtained from Nissin Chemical Co., Ltd., having an active ingredient concentration of 100%

SURFYNOL 104E, obtained from Nissin Chemical Co., Ltd., having an active ingredient concentration of 5
UNIDYNE DSN43N: polyoxyethylene perfluoroalkyl ether, obtained from Daikin Industries, Ltd., having an active ingredient concentration of 100

—Others—

POXEL GXL: preservative/fungicide containing 1,2-benzisothiazolin-3-one as a main ingredient (obtained from Avecia Pharmaceuticals, having an ingredient concentration of 20%, containing dipropylene glycol)

TABLE 1-1

| | | Ink No. | | |
|---|---|---|---|---|
| Ingredients (% by mass) | | 1 | 2 | 3 |
| Pigment dispersion | Surface-reformed black pigment dispersion (solid pigment content: 20%) | — | — | — |
| | Surface-reformed magenta pigment dispersion (solid pigment content: 20%) | — | — | — |
| | Surface-reformed cyan pigment dispersion (solid pigment content: 20%) | — | — | — |
| | Surface-reformed yellow pigment dispersion (solid pigment content: 20%) | — | — | — |
| | Magenta pigment-containing polymer particle dispersion liquid (solid pigment content: 15%) | 26.67 | — | — |
| | Cyan pigment-containing polymer particle dispersion liquid (solid pigment content: 15%) | — | 26.67 | — |
| | Yellow pigment-containing polymer particle dispersion liquid (solid pigment content: 15%) | — | — | 26.67 |
| | Carbon black pigment-containing polymer particle dispersion liquid (solid pigment content: 15%) | — | — | — |
| | Polymer-dispersed white pigment dispersion liquid (solid pigment content: 50%) | — | — | — |
| | AC-AW62 (Dainichiseika Color & Chemicals Mfg. Co., Ltd., solid pigment content: 50.0%) | — | — | — |
| Water-dispersible resin | Polyurethane dispersion [SUPERFLEX 300] (solid resin content: 33%) | — | — | — |
| | Polyurethane dispersion [TAKELAC W-6110] (solid resin content: 33.4%) | 35.93 | 35.93 | 35.93 |
| | Acrylic-silicone polymer particles (solid resin content: 40%) | — | — | — |
| Organic solvent | 2-Ethyl-1,3-hexanediol (SP: 10.6) | 2.00 | 2.00 | 2.00 |
| | 2,2,4-Trimethyl-1,3-pentanediol (SP: 10.8) | — | — | — |
| | Glycerin (SP: 16.38) | 27.00 | 27.50 | 22.00 |
| | 1,3-Butanediol (SP: 13.78) | — | — | — |
| | 3-Methyl-1,3-butanediol (SP: 12.05) | 5.00 | 5.00 | 10.00 |
| | Propylene glycol (SP: 13.72) | — | — | — |
| Surfactant | SILFACE SAG503A | 0.40 | 0.40 | 0.50 |
| | SURFYNOL 104E (active ingredient content: 50%) | — | — | — |
| | UNIDYNE DSN403N | — | — | — |
| Preservative/fungicide | PROXEL GXL | 0.05 | 0.05 | 0.05 |
| Foam suppressor (defoaming agent) | 2,4,7,9-Tetramethyldecane-4,7-diol | — | — | — |
| | 2,5,8,11-Tetramethyldodecane-5,8-diol | 0.50 | 0.50 | 0.50 |
| pH regulator | 2-Amino-2-ethyl-1,3-propanediol | 0.20 | 0.20 | 0.20 |
| | Highly pure water | balance | balance | balance |
| Total (% by mass) | | 100 | 100 | 100 |

TABLE 1-2

| | | Ink No. | | |
|---|---|---|---|---|
| Ingredients (% by mass) | | 4 | 5 | 6 |
| Pigment dispersion | Surface-reformed black pigment dispersion (solid pigment content: 20%) | — | — | — |
| | Surface-reformed magenta pigment dispersion (solid pigment content: 20%) | — | — | — |
| | Surface-reformed cyan pigment dispersion (solid pigment content: 20%) | — | — | — |
| | Surface-reformed yellow pigment dispersion (solid pigment content: 20%) | — | — | — |
| | Magenta pigment-containing polymer particle dispersion liquid (solid pigment content: 15%) | — | — | 26.67 |
| | Cyan pigment-containing polymer particle dispersion liquid (solid pigment content: 15%) | | | |

TABLE 1-2-continued

|  | Ingredients (% by mass) | Ink No. 4 | Ink No. 5 | Ink No. 6 |
|---|---|---|---|---|
|  | Yellow pigment-containing polymer particle dispersion liquid (solid pigment content: 15%) | — | — | — |
|  | Carbon black pigment-containing polymer particle dispersion liquid (solid pigment content: 15%) | 33.33 | — | — |
|  | Polymer-dispersed white pigment dispersion liquid (solid pigment content: 50%) | — | — | — |
|  | AC-AW62 (Dainichiseika Color & Chemicals Mfg. Co., Ltd., solid pigment content: 50.0%) | — | 17.66 | — |
| Water-dispersible resin | Polyurethane dispersion [SUPERFLEX 300] (solid resin content: 33%) | — | — | 36.36 |
|  | Polyurethane dispersion [TAKELAC W-6110] (solid resin content: 33.4%) | 35.93 | 29.94 | — |
|  | Acrylic-silicone polymer particles (solid resin content: 40%) | — | — | — |
| Organic solvent | 2-Ethyl-1,3-hexanediol (SP: 10.6) | 2.00 | 2.00 | — |
|  | 2,2,4-Trimethyl-1,3-pentanediol (SP: 10.8) | — | — | 2.00 |
|  | Glycerin (SP: 16.38) | 20.00 | 23.00 | 25.00 |
|  | 1,3-Butanediol (SR: 13.78) | — | — | — |
|  | 3-Methyl-1,3-butanediol (SP: 12.05) | 7.50 | 10.00 | — |
|  | Propylene glycol (SP: 13.72) | — | — | 5.00 |
| Surfactant | SILFACE SAG503A | 0.30 | 0.60 | — |
|  | SURFYNOL 104E (active ingredient content: 50%) | — | — | 0.50 |
|  | UNIDYNE DSN403N | — | — | — |
| Preservative/fungicide | PROXEL GXL | 0.05 | 0.05 | 0.05 |
| Foam suppressor (defoaming agent) | 2,4,7,9-Tetramethyldecane-4,7-diol | — | — | 0.10 |
|  | 2,5,8,11-Tetramethyldodecane-5,8-diol | 0.50 | 0.30 | — |
| pH regulator | 2-Amino-2-ethyl-1,3-propanediol | 0.20 | 0.20 | — |
|  | Highly pure water | balance | balance | balance |
|  | Total (% by mass) | 100 | 100 | 100 |

TABLE 1-3

|  | Ingredients (% by mass) | Ink No. 7 | Ink No. 8 | Ink No. 9 |
|---|---|---|---|---|
| Pigment dispersion | Surface-reformed black pigment dispersion (solid pigment content: 20%) | — | — | — |
|  | Surface-reformed magenta pigment dispersion (solid pigment content: 20%) | — | — | — |
|  | Surface-reformed cyan pigment dispersion (solid pigment content: 20%) | — | — | — |
|  | Surface-reformed yellow pigment dispersion (solid pigment content: 20%) | — | — | — |
|  | Magenta pigment-containing polymer particle dispersion liquid (solid pigment content: 15%) | — | — | — |
|  | Cyan pigment-containing polymer particle dispersion liquid (solid pigment content: 15%) | 26.67 | — | — |
|  | Yellow pigment-containing polymer particle dispersion liquid (solid pigment content: 15%) | — | 26.67 | — |
|  | Carbon black pigment-containing polymer particle dispersion liquid (solid pigment content: 15%) | — | — | 33.33 |
|  | Polymer-dispersed white pigment dispersion liquid (solid pigment content: 50%) | — | — | — |
|  | AC-AW62 (Dainichiseika Color & Chemicals Mfg. Co., Ltd., solid pigment content: 50.0%) | — | — | — |
| Water-dispersible resin | Polyurethane dispersion [SUPERFLEX 300] (solid resin content: 33%) | 36.36 | 36.36 | 36.36 |
|  | Polyurethane dispersion [TAKELAC W-6110] (solid resin content: 33.4%) | — | — | — |
|  | Acrylic-silicone polymer particles (solid resin content: 40%) | — | — | — |
| Organic solvent | 2-Ethyl-1,3-hexanediol (SP: 10.6) | — | — | — |
|  | 2,2,4-Trimethyl-1,3-pentanediol (SP: 10.8) | 3.00 | 3.00 | 2.00 |
|  | Glycerin (SP: 16.38) | 25.00 | 25.00 | 25.00 |
|  | 1,3-Butanediol (SR: 13.78) | — | — | — |
|  | 3-Methyl-1,3-butanediol (SP: 12.05) | — | — | — |
|  | Propylene glycol (SP: 13.72) | 5.00 | 5.00 | 2.00 |

TABLE 1-3-continued

|  | Ingredients (% by mass) | Ink No. 7 | Ink No. 8 | Ink No. 9 |
|---|---|---|---|---|
| Surfactant | SILFACE SAG503A | — | — | — |
|  | SURFYNOL 104E (active ingredient content: 50%) | 0.50 | 0.55 | 0.50 |
|  | UNIDYNE DSN403N | — | — | — |
| Preservative/fungicide | PROXEL GXL | 0.05 | 0.05 | 0.05 |
| Foam suppressor (defoaming agent) | 2,4,7,9-Tetramethyldecane-4,7-diol | 0.10 | 0.10 | 0.10 |
|  | 2,5,8,11-Tetramethyldodecane-5,8-diol | — | — | — |
| pH regulator | 2-Amino-2-ethyl-1,3-propanediol | — | — | — |
|  | Highly pure water | balance | balance | balance |
|  | Total (% by mass) | 100 | 100 | 100 |

TABLE 1-4

|  | Ingredients (% by mass) | Ink No. 10 | Ink No. 11 | Ink No. 12 |
|---|---|---|---|---|
| Pigment dispersion | Surface-reformed black pigment dispersion (solid pigment content: 20%) | — | — | — |
|  | Surface-reformed magenta pigment dispersion (solid pigment content: 20%) | — | 20.00 | — |
|  | Surface-reformed cyan pigment dispersion (solid pigment content: 20%) | — | — | 15.00 |
|  | Surface-reformed yellow pigment dispersion (solid pigment content: 20%) | — | — | — |
|  | Magenta pigment-containing polymer particle dispersion liquid (solid pigment content: 15%) | — | — | — |
|  | Cyan pigment-containing polymer particle dispersion liquid (solid pigment content: 15%) | — | — | — |
|  | Yellow pigment-containing polymer particle dispersion liquid (solid pigment content: 15%) | — | — | — |
|  | Carbon black pigment-containing polymer particle dispersion liquid (solid pigment content: 15%) | — | — | — |
|  | Polymer-dispersed white pigment dispersion liquid (solid pigment content: 50%) | — | — | — |
|  | AC-AW62 (Dainichiseika Color & Chemicals Mfg. Co., Ltd., solid pigment content: 50.0%) | 22.08 | — | — |
| Water-dispersible resin | Polyurethane dispersion [SUPERFLEX 300] (solid resin content: 33%) | 36.36 | — | — |
|  | Polyurethane dispersion [TAKELAC W-6110] (solid resin content: 33.4%) | — | — | — |
|  | Acrylic-silicone polymer particles (solid resin content: 40%) | — | 25.00 | 22.50 |
| Organic solvent | 2-Ethyl-1,3-hexanediol (SP: 10.6) | — | 2.00 | 2.00 |
|  | 2,2,4-Trimethyl-1,3-pentanediol (SP: 10.8) | 2.00 | — | — |
|  | Glycerin (SP: 16.38) | 25.00 | 21.00 | 23.00 |
|  | 1,3-Butanediol (SP: 13.78) | — | 10.50 | 11.50 |
|  | 3-Methyl-1,3-butanediol (SP: 12.05) | — | — | — |
|  | Propylene glycol (SP: 13.72) | 5.00 | — | — |
| Surfactant | SILFACE SAG503A | — | — | — |
|  | SURFYNOL 104E (active ingredient content: 50%) | — | — | — |
|  | UNIDYNE DSN403N | 0.02 | 0.08 | 0.08 |
| Preservative/fungicide | PROXEL GXL | 0.05 | 0.05 | 0.05 |
| Foam suppressor (defoaming agent) | 2,4,7,9-Tetramethyldecane-4,7-diol | — | — | — |
|  | 2,5,8,11-Tetramethyldodecane-5,8-diol | — | 0.32 | 0.32 |
| pH regulator | 2-Amino-2-ethyl-1,3-propanediol | — | 0.30 | 0.30 |
|  | Highly pure water | balance | balance | balance |
|  | Total (% by mass) | 100 | 100 | 100 |

TABLE 1-5

| Ingredients (% by mass) | | Ink No. 13 | Ink No. 14 | Ink No. 15 |
|---|---|---|---|---|
| Pigment dispersion | Surface-reformed black pigment dispersion (solid pigment content: 20%) | — | 25.00 | — |
| | Surface-reformed magenta pigment dispersion (solid pigment content: 20%) | — | — | — |
| | Surface-reformed cyan pigment dispersion (solid pigment content: 20%) | — | — | — |
| | Surface-reformed yellow pigment dispersion (solid pigment content: 20%) | 15.00 | — | — |
| | Magenta pigment-containing polymer particle dispersion liquid (solid pigment content: 15%) | — | — | — |
| | Cyan pigment-containing polymer particle dispersion liquid (solid pigment content: 15%) | — | — | — |
| | Yellow pigment-containing polymer particle dispersion liquid (solid pigment content: 15%) | — | — | — |
| | Carbon black pigment-containing polymer particle dispersion liquid (solid pigment content: 15%) | — | — | — |
| | Polymer-dispersed white pigment dispersion liquid (solid pigment content: 50%) | — | — | 16.00 |
| | AC-AW62 (Dainichiseika Color & Chemicals Mfg. Co., Ltd., solid pigment content: 50.0%) | — | — | — |
| Water-dispersible resin | Polyurethane dispersion [SUPERFLEX 300] (solid resin content: 33%) | — | — | — |
| | Polyurethane dispersion [TAKELAC W-6110] (solid resin content: 33.4%) | — | — | — |
| | Acrylic-silicone polymer particles (solid resin content: 40%) | 22.50 | 25.00 | 25.00 |
| Organic solvent | 2-Ethyl-1,3-hexanediol (SP: 10.6) | 2.00 | 2.00 | 2.00 |
| | 2,2,4-Trimethyl-1,3-pentanediol (SP: 10.8) | — | — | — |
| | Glycerin (SP: 16.38) | 23.00 | 20.00 | 21.00 |
| | 1,3-Butanediol (SP: 13.78) | 11.50 | — | 10.50 |
| | 3-Methyl-1,3-butanediol (SP: 12.05) | — | 10.00 | — |
| | Propylene glycol (SP: 13.72) | — | — | — |
| Surfactant | SILFACE SAG503A | — | — | — |
| | SURFYNOL 104E (active ingredient content: 50%) | | | |
| | UNIDYNE DSN403N | 0.08 | 0.04 | 0.08 |
| Preservative/fungicide | PROXEL GXL | 0.05 | 0.05 | 0.05 |
| Foam suppressor (defoaming agent) | 2,4,7,9-Tetramethyldecane-4,7-diol | — | — | — |
| | 2,5,8,11-Tetramethyldodecane-5,8-diol | 0.33 | 0.16 | 0.32 |
| pH regulator | 2-Amino-2-ethyl-1,3-propanediol | 0.30 | 0.40 | 0.30 |
| | Highly pure water | balance | balance | balance |
| | Total (% by mass) | 100 | 100 | 100 |

Next, physical properties of the obtained inks 1 to 15 were measured in the manners described below. The results are presented in Table 2.

<Viscosity of Ink>

The viscosity of the ink was measured using a viscometer (RE-85L, obtained from Toki Sangyo C., Ltd.) at 25° C.

<pH of Ink>

The pH of the ink was measured using a pH meter (HM-30R type, obtained from TOA-DKK Co., Ltd.) at 25° C.

<Static Surface Tension of Ink>

The static surface tension of the ink was measured using an automatic surface tensiometer (DY-300, obtained from Kyowa Interface Science Co., Ltd.) at 25° C.

TABLE 2

| | Ink physical properties | | |
|---|---|---|---|
| Ink No. | Viscosity (mPa·s) | pH | Static surface tension (mN/m) |
| Ink 1 | 10.79 | 8.70 | 26.7 |
| Ink 2 | 11.00 | 8.32 | 26.8 |
| Ink 3 | 11.42 | 9.11 | 26.5 |
| Ink 4 | 10.62 | 9.01 | 26.9 |
| Ink 5 | 11.43 | 9.10 | 26.5 |
| Ink 6 | 11.46 | 7.97 | 35.9 |
| Ink 7 | 11.33 | 8.00 | 35.0 |
| Ink 8 | 11.41 | 7.86 | 35.0 |
| Ink 9 | 11.64 | 8.22 | 35.7 |
| Ink 10 | 11.25 | 8.33 | 31.2 |
| Ink 11 | 8.33 | 9.51 | 21.5 |
| Ink 12 | 8.14 | 9.40 | 21.3 |
| Ink 13 | 8.20 | 9.45 | 21.2 |
| Ink 14 | 8.25 | 9.63 | 22.0 |
| Ink 15 | 8.52 | 9.56 | 21.6 |

<Preparation of Pre-Processing Fluid>

Each pre-processing fluid was produced in the manner described below.

(Pre-Processing Fluid 1)

Ammonium lactate (7.5 parts) was weighed out in a glass beaker, highly pure water (50.00 parts) was added thereto, and the resulting product was then stirred for 5 minutes. Next, 1,2-propanediol (5.00 parts), OLFINE EXP.4300 (0.1 parts), PROXEL GXL (0.05 parts), and 1,2,3-benzotriazole (0.1 parts) were added to the resulting product. The resulting product was then mixed and stirred for 15 minutes. Next, a fatty acid amide-based resin SIZE PINE DL-15 (obtained from Arakawa Chemical Industries, Ltd.) (6.67 parts) was added to the resulting product, and highly pure water was further added to the resulting product to add up to 100 parts in total. The resulting product was mixed and stirred for 10 minutes.

The obtained mixture was filtrated through a nylon mesh #200, to remove unwanted substances such as insoluble matter, to produce [Pre-processing fluid 1].

(Pre-Processing Fluid 2)

Ammonium lactate (7.5 parts) was weighed out in a glass beaker, highly pure water (50.00 parts) was added thereto, and the resulting product was then stirred for 5 minutes. Next, 1,2-propanediol (5.00 parts), OLFINE EXP.4300 (0.1 parts), PROXEL GXL (0.05 parts), and 1,2,3-benzotriazole (0.1 parts) were added to the resulting product. The resulting product was then mixed and stirred for 15 minutes. Next, a rosin-based sizing agent SIZE PINE N-811 (obtained from Arakawa Chemical Industries, Ltd.) (2.00 parts) was added to the resulting product, and highly pure water was further added to the resulting product to add up to 100 parts in total. The resulting product was mixed and stirred for 10 minutes.

The obtained mixture was filtrated through a nylon mesh #200, to remove unwanted substances such as insoluble matter, to produce [Pre-processing fluid 2].

(Pre-Processing Fluids 3 to 18)

[Pre-processing fluid 3] to [Pre-processing fluid 18] were produced in the same manner as in production of [Pre-processing fluid 1], except that unlike in production of [Pre-processing fluid 1], the respective ingredients were mixed as prescribed in Tables 3-1 to 3-6.

The compositions of the pre-processing fluids 1 to 18 are presented in Tables 3-1 to 3-6.

The details of, for example, abbreviations in Tables 3-1 to 3-6 are as follows.

—Cation Polymer—
SHAROL DC-902P: polydimethyl diallyl ammonium chloride (a compound represented by General formula (3)), having a solid content of 51.0%, obtained from DKS Co., Ltd.
DK6810: polyamine resin, having a solid content of 55.0%, obtained from Seiko PMC Corporation
Nonionic resin particles
TAKELAC W-635: polyurethane emulsion, having a solid content of 35% and a glass transition temperature (Tg) of 70° C., obtained from Mitsui Chemicals, Inc.
SUMIKAFLEX850HQ: ethylene-vinyl chloride-vinyl acetate-based copolymer, having a solid content of 50%, obtained from Sumitomo Chemical Co., Ltd.
SUMIKAFLEX951HQ: ethylene-vinyl acetate-vinyl versatate copolymer, having a solid content of 55%, obtained from Sumitomo Chemical Co., Ltd.

—Surfactant—
OLFINE EXP.4300, obtained from Nissin Chemical Co., Ltd., having an active ingredient concentration of 60%

—Sizing Agent—
Rosin-based sizing agent_maleated rosin compound: SIZE PINE N-811, having a solid content of 50%, emulsified, obtained from Arakawa Chemical Industries, Ltd.
Rosin-based sizing agent_acrylated rosin compound: POLYMARONE 351T, having a solid content of 10%, emulsified, obtained from Arakawa Chemical Industries, Ltd.
Rosin-based sizing agent: AL1309, having a solid content of 50%, emulsified, obtained from Seiko PMC Corporation
Rosin-based sizing agent: HARSIZE NES-745, having a solid content of 50%, emulsified, obtained from Harima Chemicals Group, Inc.
Compound represented by General formula (I)_alkyl ketene dimer compound: SIZE PINE K-931, having a solid content of 30%, emulsified, obtained from Arakawa Chemical Industries, Ltd.
Compound represented by General formula (I)_alkyl ketene dimeter compound: AD1608, having a solid content of 25%, emulsified, obtained from Seiko PMC Corporation
Compound represented by General formula (I)_alkyl ketene dimeter compound: AD1614, having a solid content of 30%, emulsified, obtained from Seiko PMC Corporation
Fatty acid amide-based resin: SIZE PINE DL-15, having a solid content of 15%, emulsified, obtained from Arakawa Chemical Industries, Ltd.
Polyacrylamide-based resin: POLYSTRON 1250, having a solid content of 20%, emulsified, obtained from Arakawa Chemical Industries, Ltd.
Styrene acrylate-based sizing agent SE2202, having a solid content of 20%, emulsified, obtained from Seiko PMC Corporation —WAX—
AQUACER531: modified polyethylene wax, having an active ingredient concentration of 45%, obtained from BYK Japan KK —Others—
PROXEL GXL: preservative/fungicide containing 1,2-benzisothiazolin-3-one as a main ingredient (obtained from Avecia Pharmaceuticals, having an ingredient concentration of 20%, containing dipropylene glycol)

TABLE 3-1

| Ingredients (% by mass) | | Solid concentration (% by mass) | Pre-processing fluid No. | | |
|---|---|---|---|---|---|
| | | | 1 | 2 | 3 |
| Cationic surfactant | Benzalkonium chloride | 10% | — | — | 20.00 |
| Organic acid ammonium salt | Ammonium lactate | 100% | 7.50 | 7.50 | — |
| | Ammonium acetate | 75% | — | — | — |
| Organic acid metal salt | Calcium lactate | 100% | — | — | — |
| | Calcium tartrate | 100% | — | — | — |
| Inorganic metal salt | Magnesium sulfate | 100% | — | — | — |
| | Calcium chloride | 100% | — | — | — |

TABLE 3-1-continued

| Ingredients (% by mass) | | Solid concentration (% by mass) | Pre-processing fluid No. 1 | Pre-processing fluid No. 2 | Pre-processing fluid No. 3 |
|---|---|---|---|---|---|
| Cation polymer | SHAROL DC-902P (DKS Co., Ltd.) | 51% | — | — | — |
| | DK6810 (Seiko PMC Corp.) | 55% | — | — | — |
| Nonionic resin particles (emulsion) | TAKELAC W-635 (Mitsui Chemicals, Inc.) | 35% | — | — | — |
| | SUMIKAFLEX850HQ (Sumitomo Chemical Co., Ltd.) | 50% | — | — | — |
| | SUMIKAFLEX951HQ (Sumitomo Chemical Co., Ltd.) | 55% | — | — | — |
| Organic solvent | 1,2-Propanediol | 100% | 5.00 | 5.00 | 5.00 |
| Surfactant | OLFINE EXP.4300 (Nissin Chemical Co., Ltd.) | 60% | 0.10 | 0.10 | 0.10 |
| Sizing agent (emulsified) | Rosin-based sizing agent_SIZE PINE N-811 (Arakawa Chemical Industries, Ltd.), maleated rosin | 50% | — | 2.00 | 2.00 |
| | Rosin-based, sizing agent_POLYMARONE 351T (Arakawa Chemical Industries, Ltd.), acrylated rosin | 10% | — | — | — |
| | Rosin-based sizing agent_AL1309 (Seiko PMC Corp.) | 50% | — | — | — |
| | Rosin-based sizing agent_HARSIZE NES-745 (Harima Chemicals Group) | 50% | — | — | — |
| | Compound of General formula (I)_SIZE PINE K-931 (Arakawa Chemical Industries, Ltd.) | 30% | — | — | — |
| | Compound of General formula (I)_AD1608 (Seiko PMC Corp.) | 25% | — | — | — |
| | Compound of General formula (I)_AD1614 (Seiko PMC Corp.) | 30% | — | — | — |
| | Fatty acid amide-based resin_SIZE PINE DL-15 (Arakawa Chemical Industries, Ltd.) | 15% | 6.67 | — | — |
| | Polyacrylamide-based resin_POLYSTRON 1250 (Arakawa Chemical Industries, Ltd.) | 20% | — | — | — |
| | Styrene acrylate-based sizing agent SE2202 (Seiko PMC Corp.) | 20% | — | — | — |
| WAX | AQUACER 531 (BYK Japan KK) | 45% | — | — | — |
| Preservative/ fungicide | PROXEL GXL | 20% | 0.05 | 0.05 | 0.05 |
| Corrosion inhibitor | 1,2,3-Benzotriazole | 100% | 0.10 | 0.10 | 0.10 |
| | Highly pure water | | balance | balance | balance |
| | Total (% by mass) | | 100 | 100 | 100 |

TABLE 3-2

| Ingredients (% by mass) | | Solid concentration (% by mass) | Pre-processing fluid No. 4 | Pre-processing fluid No. 5 | Pre-processing fluid No. 6 |
|---|---|---|---|---|---|
| Cationic surfactant | Benzalkonium chloride | 10% | — | — | — |
| Organic acid ammonium salt | Ammonium lactate | 100% | — | — | — |
| | Ammonium acetate | 75% | 13.33 | 13.33 | — |
| Organic acid metal salt | Calcium lactate | 100% | — | — | 10.00 |
| | Calcium tartrate | 100% | — | — | — |
| Inorganic metal salt | Magnesium sulfate | 100% | — | — | — |
| | Calcium chloride | 100% | — | — | — |
| Cation polymer | SHAROL DC-902P (DKS Co., Ltd.) | 51% | — | — | — |
| | DK6810 (Seiko PMC Corp.) | 55% | — | — | — |
| Nonionic resin particles (emulsion) | TAKELAC W-635 (Mitsui Chemicals, Inc.) | 35% | — | — | — |
| | SUMIKAFLEX850HQ (Sumitomo Chemical Co., Ltd.) | 50% | — | 6.00 | 6.00 |
| | SUMIKAFLEX951HQ (Sumitomo Chemical Co., Ltd.) | 55% | — | — | — |
| Organic solvent | 1,2-Propanediol | 100% | 5.00 | 5.00 | 5.00 |

TABLE 3-2-continued

|  | Ingredients (% by mass) | Solid concentration (% by mass) | Pre-processing fluid No. 4 | 5 | 6 |
|---|---|---|---|---|---|
| Surfactant | OLFINE EXP.4300 (Nissin Chemical Co., Ltd.) | 60% | 0.10 | 0.10 | 0.10 |
| Sizing agent (emulsified) | Rosin-based sizing agent_SIZE PINE N-811 (Arakawa Chemical Industries, Ltd.), maleated rosin | 50% | — | — | — |
|  | Rosin-based sizing agent_POLYMARONE 351T (Arakawa Chemical Industries, Ltd.), acrelated rosin | 10% | — | — | — |
|  | Rosin-based sizing agent_AL1309 (Seiko PMC Corp.) | 50% | 4.00 | 4.00 | — |
|  | Rosin-based sizing agent_HARSIZE NES-745 (Harima Chemicals Group) | 50% | — | — | — |
|  | Compound of General formula (I)_SIZE PINE K-931 (Arakawa Chemical Industries, Ltd.) | 30% | — | — | — |
|  | Compound of General formula (I)_AD1608 (Seiko PMC Corp.) | 25% | — | — | — |
|  | Compound of General formula (I)_AD1614 (Seiko PMC Corp.) | 30% | — | — | — |
|  | Fatty acid amide-based resin_SIZE PINE DL-15 (Arakawa Chemical Industries, Ltd.) | 15% | — | — | — |
|  | Polyacrylamide-based resin_POLYSTRON 1250 (Arakawa Chemical Industries, Ltd.) | 20% | — | — | 10.00 |
|  | Styrene acrylate-based sizing agent SE2202 (Seiko PMC Corp.) | 20% | — | — | — |
| WAX | AQUACER 531 (BYK Japan KK) | 45% | — | — | — |
| Preservative/ fungicide | PROXEL GXL | 20% | 0.05 | 0.05 | 0.05 |
| Corrosion inhibitor | 1,2,3-Benzotriazole | 100% | 0.10 | 0.10 | 0.10 |
|  | Highly pure water |  | balance | balance | balance |
|  | Total (% by mass) |  | 100 | 100 | 100 |

TABLE 3-3

|  | Ingredients (% by mass) | Solid concentration (% by mass) | Pre-processing fluid No. 7 | 8 | 9 |
|---|---|---|---|---|---|
| Cationic surfactant | Benzalkonium chloride | 10% | — | — | — |
| Organic acid ammonium salt | Ammonium lactate | 100% | — | — | — |
|  | Ammonium acetate | 75% | — | — | — |
| Organic acid metal salt | Calcium lactate | 100% | — | — | — |
|  | Calcium tartrate | 100% | 12.00 | — | — |
| Inorganic metal salt | Magnesium sulfate | 100% | — | 10.00 | — |
|  | Calcium chloride | 100% | — | — | 10.00 |
| Cation polymer | SHAROL DC-902P (DKS Co., Ltd.) | 51% | — | — | — |
|  | DK6810 (Seiko PMC Corp.) | 55% | — | — | — |
| Nonionic resin particles (emulsion) | TAKELAC W-635 (Mitsui Chemicals, Inc.) | 35% | 8.57 | 17.14 | — |
|  | SUMIKAFLEX850HQ (Sumitomo Chemical Co., Ltd.) | 50% | — | — | 12.00 |
|  | SUMIKAFLEX951HQ (Sumitomo Chemical Co., Ltd.) | 55% | — | — | — |
| Organic solvent | 1,2-Propanediol | 100% | 5.00 | 3.00 | — |
| Surfactant | OLFINE EXP.4300 (Nissin Chemical Co., Ltd.) | 60% | 0.10 | — | — |
| Sizing agent (emulsified) | Rosin-based sizing agent_SIZE PINE N-811 (Arakawa Chemical Industries, Ltd.), maleated rosin | 50% | — | — | — |
|  | Rosin-based sizing agent_POLYMARONE 351T (Arakawa Chemical Industries, Ltd.), acrelated rosin | 10% | 20.00 | — | — |

TABLE 3-3-continued

| Ingredients (% by mass) | | Solid concentration (% by mass) | Pre-processing fluid No. 7 | 8 | 9 |
|---|---|---|---|---|---|
| | Rosin-based sizing agent_AL1309 (Seiko PMC Corp.) | 50% | — | — | — |
| | Rosin-based sizing agent_HARSIZE NES-745 (Harima Chemicals Group) | 50% | — | 4.00 | — |
| | Compound of General formula (I)_SIZE PINE K-931 (Arakawa Chemical Industries, Ltd.) | 30% | — | — | 6.67 |
| | Compound of General formula (I)_AD1608 (Seiko PMC Corp.) | 25% | — | — | — |
| | Compound of General formula (I)_AD1614 (Seiko PMC Corp.) | 30% | — | — | — |
| | Fatty acid amide-based resin_SIZE PINE DL-15 (Arakawa Chemical Industries, Ltd.) | 15% | — | — | — |
| | Polyacrylamide-based resin_POLYSTRON 1250 (Arakawa Chemical Industries, Ltd.) | 20% | — | — | — |
| | Styrene acrylate-based sizing agent SE2202 (Seiko PMC Corp.) | 20% | — | — | — |
| WAX | AQUACER 531 (BYK Japan KK) | 45% | — | — | — |
| Preservative/ fungicide | PROXEL GXL | 20% | 0.05 | 0.05 | 0.05 |
| Corrosion inhibitor | 1,2,3-Benzotriazole | 100% | 0.10 | 0.10 | 0.10 |
| | Highly pure water | | balance | balance | balance |
| | Total (% by mass) | | 100 | 100 | 100 |

TABLE 3-4

| Ingredients (% by mass) | | Solid concentration (% by mass) | Pre-processing fluid No. 10 | 11 | 12 |
|---|---|---|---|---|---|
| Cationic surfactant | Benzalkonium chloride | 10% | — | — | — |
| Organic acid ammonium salt | Ammonium lactate | 100% | — | — | — |
| | Ammonium acetate | 75% | — | — | — |
| Organic acid metal salt | Calcium lactate | 100% | — | — | — |
| | Calcium tartrate | 100% | — | — | — |
| Inorganic metal salt | Magnesium sulfate | 100% | 10.00 | — | — |
| | Calcium chloride | 100% | — | 10.00 | — |
| Cation polymer | SHAROL DC-902P (DKS Co., Ltd.) | 51% | — | — | 13.61 |
| | DK6810 (Seiko PMC Corp.) | 55% | — | — | — |
| Nonionic resin | TAKELAC W-635 (Mitsui Chemicals, Inc.) | 35% | — | — | — |
| particles (emulsion) | SUMIKAFLEX850HQ (Sumitomo Chemical Co., Ltd.) | 50% | — | 12.00 | 20.00 |
| | SUMIKAFLEX951HQ (Sumitomo Chemical Co., Ltd.) | 55% | 10.91 | — | — |
| Organic solvent | 1,2-Propanediol | 100% | — | — | — |
| Surfactant | OLFINE EXP.4300 (Nissin Chemical Co., Ltd.) | 60% | — | — | — |
| Sizing agent (emulsified) | Rosin-based sizing agent_SIZE PINE N-811 (Arakawa Chemical Industries, Ltd.), maleated rosin | 50% | — | — | 4.00 |
| | Rosin-based sizing agent_POLYMARONE 351T (Arakawa Chemical Industries, Ltd.), acrylated rosin | 10% | — | — | — |
| | Rosin-based sizing agent_AL1309 (Seiko PMC Corp.) | 50% | — | — | — |
| | Rosin-based sizing agent_HARSIZE NES-745 (Harima Chemicals Group) | 50% | — | — | — |
| | Compound of General formula (I)_SIZE PINE K-931 (Arakawa Chemical Industries, Ltd.) | 30% | — | — | — |
| | Compound of General formula (I)_AD1608 (Seiko PMC Corp.) | 25% | 12.00 | — | — |

TABLE 3-4-continued

| | Ingredients (% by mass) | Solid concentration (% by mass) | Pre-processing fluid No. 10 | Pre-processing fluid No. 11 | Pre-processing fluid No. 12 |
|---|---|---|---|---|---|
| | Compound of General formula (I)_AD1614(Seiko PMC Corp.) | 30% | — | 10.00 | — |
| | Fatty acid amide-based resin_SIZE PINE DL-15 (Arakawa Chemical Industries, Ltd.) | 15% | — | — | — |
| | Polyacrylamide-based resin_POLYSTRON 1250 (Arakawa Chemical Industries, Ltd.) | 20% | — | — | — |
| | Styrene acrylate-based sizing agent SE2202 (Seiko PMC Corp.) | 20% | — | — | — |
| WAX | AQUACER 531 (BYK Japan KK) | 45% | — | — | — |
| Preservative/fungicide | PROXEL GXL | 20% | 0.05 | 0.05 | 0.05 |
| Corrosion inhibitor | 1,2,3-Benzotriazole | 100% | 0.10 | 0.10 | 0.10 |
| | Highly pure water | | balance | balance | balance |
| | Total (% by mass) | | 100 | 100 | 100 |

TABLE 3-5

| | Ingredients (% by mass) | Solid concentration (% by mass) | Pre-processing fluid No. 13 | Pre-processing fluid No. 14 | Pre-processing fluid No. 15 |
|---|---|---|---|---|---|
| Cationic surfactant | Benzalkonium chloride | 10% | — | — | — |
| Organic acid ammonium salt | Ammonium lactate | 100% | — | — | — |
| | Ammonium acetate | 75% | — | — | — |
| Organic acid metal salt | Calcium lactate | 100% | — | 10.00 | — |
| | Calcium tartrate | 100% | — | — | 10.00 |
| Inorganic metal salt | Magnesium sulfate | 100% | — | — | — |
| | Calcium chloride | 100% | — | — | — |
| Cation polymer | SHAROL DC-902P (DKS Co., Ltd.) | 51% | — | — | — |
| | DK6810 (Seiko PMC Corp.) | 55% | 22.73 | — | — |
| Nonionic resin | TAKELAC W-635 (Mitsui Chemicals, Inc.) | 35% | — | — | — |
| particles (emulsion) | SUMIKAFLEX850HQ (Sumitomo Chemical Co., Ltd.) | 50% | — | — | 12.00 |
| | SUMIKAFLEX951HQ (Sumitomo Chemical Co., Ltd.) | 55% | 10.91 | 10.91 | — |
| Organic solvent | 1,2-Propanediol | 100% | — | — | — |
| Surfactant | OLFINE EXP.4300 (Nissin Chemical Co., Ltd.) | 60% | — | — | — |
| Sizing agent (emulsified) | Rosin-based sizing agent_SIZE PINE N-811 (Arakawa Chemical Industries, Ltd.), maleated rosin | 50% | — | — | — |
| | Rosin-based sizing agent_POLYMARONE 351T (Arakawa Chemical Industries, Ltd.), acrelated rosin | 10% | 15.00 | — | — |
| | Rosin-based sizing agent_AL1309 (Seiko PMC Corp.) | 50% | — | — | — |
| | Rosin-based sizing agent_HARSIZE NES-745 (Harima Chemicals Group) | 50% | — | — | — |
| | Compound of General formula (I)_SIZE PINE K-931 (Arakawa Chemical Industries, Ltd.) | 30% | — | — | — |
| | Compound of General formula (I)_AD1608 (Seiko PMC Corp.) | 25% | — | 12.00 | — |
| | Compound of General formula (I)_AD1614(Seiko PMC Corp.) | 30% | — | — | 10.00 |
| | Fatty acid amide-based resin_SIZE PINE DL-15 (Arakawa Chemical Industries, Ltd.) | 15% | — | — | — |
| | Polyacrylamide-based resin_POLYSTRON 1250 (Arakawa Chemical Industries, Ltd.) | 20% | — | — | — |
| | Styrene acrylate-based sizing agent SE2202 (Seiko PMC Corp.) | 20% | — | — | — |

TABLE 3-5-continued

| | | Solid concentration | Pre-processing fluid No. | | |
|---|---|---|---|---|---|
| | Ingredients (% by mass) | (% by mass) | 13 | 14 | 15 |
| WAX | AQUACER 531 (BYK Japan KK) | 45% | — | — | — |
| Preservative/fungicide | PROXEL GXL | 20% | 0.05 | 0.05 | 0.05 |
| Corrosion inhibitor | 1,2,3-Benzotriazole | 100% | 0.10 | 0.10 | 0.10 |
| | Highly pure water | | balance | balance | balance |
| | Total (% by mass) | | 100 | 100 | 100 |

TABLE 3-6

| | | Solid concentration | Pre-processing fluid No. | | |
|---|---|---|---|---|---|
| | Ingredients (% by mass) | (% by mass) | 16 | 17 | 18 |
| Cationic surfactant | Benzalkonium chloride | 10% | — | — | — |
| Organic acid ammonium salt | Ammonium lactate | 100% | — | — | — |
| | Ammonium acetate | 75% | — | — | — |
| Organic acid metal salt | Calcium lactate | 100% | — | — | — |
| | Calcium tartrate | 100% | — | — | — |
| Inorganic metal salt | Magnesium sulfate | 100% | — | — | 10.00 |
| | Calcium chloride | 100% | 10.00 | 10.00 | — |
| Cation polymer | SHAROL DC-902P (DKS Co., Ltd.) | 51% | — | — | — |
| | DK6810 (Seiko PMC Corp.) | 55% | — | — | — |
| Nonionic resin particles (emulsion) | TAKELAC W-635 (Mitsui Chemicals, Inc.) | 35% | — | — | 17.14 |
| | SUMIKAFLEX850HQ (Sumitomo Chemical Co., Ltd.) | 50% | 12.00 | 12.00 | — |
| | SUMIKAFLEX951HQ (Sumitomo Chemical Co., Ltd.) | 55% | — | — | — |
| Organic solvent | 1,2-Propanediol | 100% | — | — | 3.00 |
| Surfactant | OLFINE EXP.4300 (Nissin Chemical Co., Ltd.) | 60% | — | — | — |
| Sizing agent (emulsified) | Rosin-based sizing agent_SIZE PINE N-811 (Arakawa Chemical Industries, Ltd.), maleated rosin | 50% | — | — | — |
| | Rosin-based sizing agent_POLYMARONE 351T (Arakawa Chemical Industries, Ltd.), acrelated rosin | 10% | — | — | — |
| | Rosin-based sizing agent_AL1309 (Seiko PMC Corp.) | 50% | — | — | — |
| | Rosin-based sizing agent_HARSIZE NES-745 (Harima Chemicals Group) | 50% | — | — | — |
| | Compound of General formula (I)_SIZE PINE K-931 (Arakawa Chemical Industries, Ltd.) | 30% | — | — | — |
| | Compound of General formula (I)_AD1608 (Seiko PMC Corp.) | 25% | — | — | — |
| | Compound of General formula (I)_AD1614 (Seiko PMC Corp.) | 30% | — | — | — |
| | Fatty acid amide-based resin_SIZE PINE DL-15 (Arakawa Chemical Industries, Ltd.) | 15% | — | — | — |
| | Polyacrylamide-based resin_POLYSTRON 1250 (Arakawa Chemical Industries, Ltd.) | 20% | — | — | — |
| | Styrene acrylate-based sizing agent SE2202 (Seiko PMC Corp.) | 20% | — | — | 10.00 |
| WAX | AQUACER 531 (BYK Japan KK) | 45% | — | 4.44 | — |
| Preservative/fungicide | PROXEL GXL | 20% | 0.05 | 0.05 | 0.05 |
| Corrosion inhibitor | 1,2,3-Benzotriazole | 100% | 0.10 | 0.10 | 0.10 |
| | Highly pure water | | balance | balance | balance |
| | Total (% by mass) | | 100 | 100 | 100 |

EXAMPLE/COMPARATIVE EXAMPLES

Using the combination of a cloth, a pre-processing fluid, and an ink presented in Tables 4-1 and 4-2, an image was formed on the cloth by an image forming method described below.

<Cloth>

The following products were used as the cloth.
- 00300-ACT: light-colored polyester T-shirt, GLIMMER 00300-ACT WHITE (obtained from Toms Co., Ltd.)
- 00300-ACT: deep-colored polyester T-shirt, GLIMMER 00300-ACT BLACK (obtained from Toms Co., Ltd.)
- 00085-CVT: deep-colored cotton T-shirt, PRINTSTAR 00085-CVT BLACK (obtained from Toms Co., Ltd.)

<Image Forming Method>

Under environmental conditions adjusted to 23° C.±0.5° C. and 50%±5% RH, the driving voltages for piezo elements of an inkjet printer [DIRECT TO GARMENT PRINTER RICOH RI 6000, obtained from Ricoh Company, Ltd.] were varied in a manner that the amount of the ink to be discharged would be uniform, such that the amount of the ink to be attached on the print medium (cloth) would be uniform.

First, the pre-processing fluid presented in Tables 4-1 and 4-2 was applied on the cloth by the applying method presented in Tables 4-1 and 4-2 in the attaching amount presented in Tables 4-1 and 4-2. Subsequently, the light-colored polyester T-shirt and the deep-colored polyester T-shirt were dried in an oven at 130° C. for 90 seconds, and the deep-colored cotton T-shirt was dried in an oven at 165° C. for 90 seconds. In this way, a pre-process was applied to the print medium.

Examples 1 to 3

Figure 4:
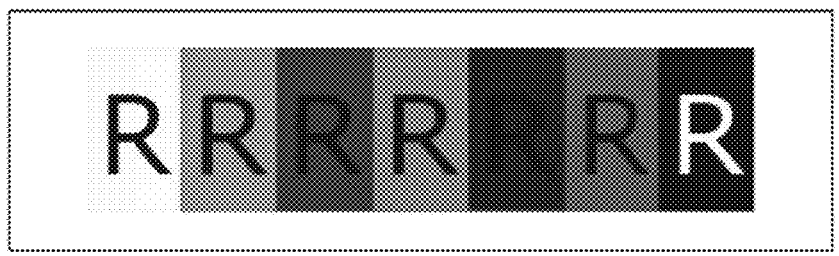
FIG. 4 is a view illustrating an image obtained by forming a chart using color inks on the solid image of the white ink of FIG. 3.

An inkjet printer [DIRECT TO GARMENT PRINTER RICOH RI 6000] was filled with the color inks prepared above. With the color inks, a digital image of the chart illustrated in FIG. 4 obtained using PHOTOSHOP (registered trademark) without color correction was printed on the pre-processed cloth in the attaching amount presented in Table 4-1 at 600 dpi×600 dpi.

Examples 4 to 6 and 10 to 12

An inkjet printer [DIRECT TO GARMENT PRINTER RICOH RI 6000] was filled with the white ink prepared above. With the white ink, a solid image illustrated in FIG. 3 was printed on the pre-processed cloth in the attaching amount presented in Table 4-1.

Examples 7 to 9, 13 to 18, 20, and 21

Figure 3:
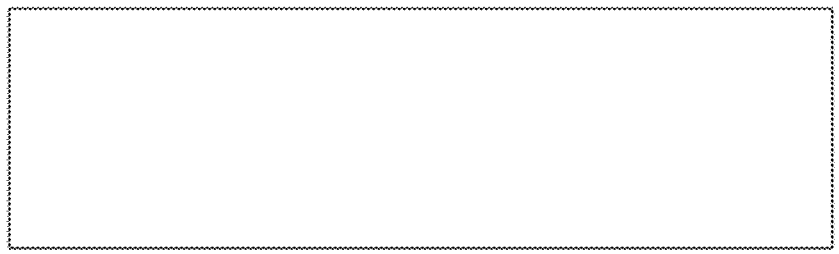
FIG. 3 is a view illustrating a solid image obtained by solidly printing a white ink on a cloth to which a pre-processing fluid is applied.

An inkjet printer [DIRECT TO GARMENT PRINTER RICOH RI 6000] was filled with the white ink and the color inks prepared above. The white ink was solidly printed as illustrated in FIG. 3 on the pre-processed cloth in the attaching amount presented in Tables 4-1 and 4-2. Continuously (approximately 17 seconds after the white ink was printed), a digital image of the chart illustrated in FIG. 4 obtained using PHOTOSHOP (registered trademark) without color correction was printed with the color inks in the attaching amount presented in Tables 4-1 and 4-2 at 600 dpi×600 dpi.

Example 19

A printed matter of Example 19 was produced in the same manner as in Example 2, except that the cotton broad cloth used in Example 2 as a cloth was changed to a cloth formed of biodegradable polyester fiber made of a homogeneous mixture of the composition described below.

—Composition of Biodegradable Polyester Fiber—
- Polybutylene adipate terephthalate: 84.1 parts
- Polylactic acid: 10.0 parts
- Talc powder: 1.6 parts
- ADR4370 (obtained from BASF GmbH): 0.3 parts
- Stearamide: 0.5 parts
- Tetrahydrofuran: 15 ppm (relative to the whole composition)
- Cyclopentanone: 10 ppm (relative to the whole composition)

Comparative Example 1

An inkjet printer [DIRECT TO GARMENT PRINTER RICOH RI 6000] was filled with the color inks prepared above. With the color inks, a digital image of the chart illustrated in FIG. 4 obtained using PHOTOSHOP (registered trademark) without color correction was printed on a non-pre-processed cloth in the attaching amount presented in Table 4-2 at 600 dpi×600 dpi.

Comparative Examples 2 and 5

An inkjet printer [DIRECT TO GARMENT PRINTER RICOH RI 6000] was filled with the white ink and the color inks prepared above. The white ink was solidly printed as illustrated in FIG. 3 on a non-pre-processed cloth presented in Table 4-2 in the attaching amount presented in Table 4-2. Continuously (approximately 17 seconds after the white ink was printed), a digital image of the chart illustrated in FIG. 4 obtained using PHOTOSHOP (registered trademark) without color correction was printed with the color inks in the attaching amount presented in Table 4-2 at 600 dpi×600 dpi.

Comparative Examples 3, 4, 6, and 7

An inkjet printer [DIRECT TO GARMENT PRINTER RICOH RI 6000] was filled with the white ink and the color inks prepared above. The white ink was solidly printed as illustrated in FIG. 3 on a pre-processed cloth presented in Table 4-2 in the attaching amount presented in Table 4-2. Continuously (approximately 17 seconds after the white ink was printed), a digital image of the chart illustrated in FIG. 4 obtained using PHOTOSHOP (registered trademark) without color correction was printed with the color inks in the attaching amount presented in Table 4-2 at 600 dpi×600 dpi.

—Drying after Printing—

The print-applied cloth was dried in the manner described below depending on the kind of the cloth.
- Light-colored polyester T-shirt: dried in an oven at 130° C. for 3 minutes
- Deep-colored polyester T-shirt: dried in an oven at 130° C. for 3 minutes
- Deep-colored cotton T-shirt: dried in an oven at 165° C. for 2 minutes Next, for each obtained image, brightness by Hunter, color bleed, and beading were evaluated in the manners described below. The results are presented in Tables 4-1 and 4-2.

<Brightness by Hunter>

The image density of a white solid portion of each obtained image was measured using a spectrophotometric colorimeter (X-RITE EXACT, obtained from X-Rite, Inc.), and brightness by Hunter (w) was calculated according to the calculation formula (1) below.

$$W=100-\{(100-L)*2+(a*^2+b*^2)\}^{1/2} \quad (1)$$

(In the formula, L*, a*, and b* represent L value (luminosity), a value (redness), and b value (yellowness), respectively.)

For the measurement of the image density, the sample to be evaluated was measured while being placed on stacked five sheets of black-color wood-free paper having a middle thickness (0.09 mm) (obtained from Hokuetsu Corporation).

Brightness by Hunter was evaluated according to the criteria described below. C, B, and A are practically usable levels.

[Evaluation Criteria]
A: Brightness by Hunter was 85 or higher.
B: Brightness by Hunter was 80 or higher and lower than 85.
C: Brightness by Hunter was 75 or higher and lower than 80.
D: Brightness by Hunter was 70 or higher and lower than 75.
E: Brightness by Hunter was lower than 70.

<Color Bleed>

With the inks in the set of inks presented in each Example or Comparative Example, a solid image was printed on the cloth used in each Example or Comparative Example under the printing conditions specified in each Example or Comparative Example. Because the property to be evaluated was color bleed, a solid image of an ink having a different color from that of the ink to be evaluated was printed at the same time in an adjoining area. For example, a yellow ink was printed in an adjoining area when the ink to be evaluated was black, and a magenta ink was printed in an adjoining area when the ink to be evaluated was cyan, to visually observe occurrence of color bleed (bleed at color boundary). C, B, and A are practically usable levels.

[Evaluation Criteria]
A: There was no bleed at all at the color boundary.
B: There was a very slight bleed at the color boundary.
C: There was a slight bleed at the color boundary (non-problematic for actual use).
D: There was bleed at the color boundary.
E: There was a severe bleed at the color boundary.

<Beading>

With the inks in the set of inks presented in each Example or Comparative Example, a solid image was printed on the cloth used in each Example or Comparative Example under the printing conditions specified in each Example or Comparative Example. Beading (density unevenness) on the solid image portion was observed and evaluated according to the evaluation criteria described below. B and A are practically usable levels.

[Evaluation Criteria]
A: There was no density unevenness at all.
B: There was a slight density unevenness.
C: There was density unevenness.
D: There was a severe density unevenness.

TABLE 4-1

| | Cloth | Pre-processing fluid | Pre-processing fluid applying method | Amount (g/m²) of pre-processing fluid attached wet | Ink | Amount (g/m²) of white ink attached wet | Amount (g/m²) of color ink attached wet | Brightness by Hunter | Color bleed (bleed at color boundary) | Beading (solid density unevenness) |
|---|---|---|---|---|---|---|---|---|---|---|
| Ex. 1 | 00300-ACT_WHITE | Pre-processing fluid 1 | Hand spraying | 200 | Inks 1 to 4 | — | 20 | Not evaluated | A | A |
| Ex. 2 | 00300-ACT_WHITE | Pre-processing fluid 2 | Hand spraying | 200 | Inks 6 to 9 | — | 20 | Not evaluated | A | A |
| Ex. 3 | 00300-ACT_WHITE | Pre-processing fluid 3 | Hand spraying | 200 | Inks 11 to 14 | — | 20 | Not evaluated | B | B |
| Ex. 4 | 00085-CVT_BLACK | Pre-processing fluid 4 | Hand spraying | 336 | Ink 5 | 220 | — | B | Not evaluated | A |
| Ex. 5 | 00085-CVT_BLACK | Pre-processing fluid 5 | Hand spraying | 336 | Ink 10 | 220 | — | A | Not evaluated | A |
| Ex. 6 | 00085-CVT_BLACK | Pre-processing fluid 6 | Hand spraying | 336 | Ink 15 | 220 | — | B | Not evaluated | A |
| Ex. 7 | 00085-CVT_BLACK | Pre-processing fluid 7 | Hand spraying | 336 | Inks 1 to 5 | 220 | 20 | A | A | A |
| Ex. 8 | 00085-CVT_BLACK | Pre-processing fluid 8 | Hand spraying | 336 | Inks 6 to 10 | 220 | 20 | B | B | A |
| Ex. 9 | 00085-CVT_BLACK | Pre-processing fluid 9 | Hand spraying | 336 | Inks 11 to 15 | 220 | 20 | A | A | A |
| Ex. 10 | 00300-ACT_BLACK | Pre-processing fluid 10 | Hand spraying | 352 | Ink 5 | 270 | — | A | Not evaluated | A |
| Ex. 11 | 00300-ACT_BLACK | Pre-processing fluid 11 | Hand spraying | 352 | Ink 10 | 270 | — | A | Not evaluated | A |
| Ex. 12 | 00300-ACT_BLACK | Pre-processing fluid 12 | Hand spraying | 352 | Ink 15 | 270 | — | A | Not evaluated | A |
| Ex. 13 | 00300-ACT_BLACK | Pre-processing fluid 13 | Hand spraying | 352 | Inks 1 to 5 | 270 | 20 | A | A | A |
| Ex. 14 | 00300-ACT_BLACK | Pre-processing fluid 14 | Hand spraying | 352 | Inks 6 to 10 | 270 | 20 | A | B | A |

TABLE 4-2

| | Cloth | Pre-processing fluid | Pre-processing fluid applying method | Amount (g/m²) of pre-processing fluid attached wet | Ink | Amount (g/m²) of white ink attached wet | Amount (g/m²/ of color ink attached wet | Brightness by Hunter | Color bleed (bleed at color boundary) | Beading (solid density unevenness) |
|---|---|---|---|---|---|---|---|---|---|---|
| Ex. 15 | 00300-ACT_BLACK | Pre-processing fluid 15 | Hand spraying | 352 | Inks 11 to 15 | 270 | 20 | A | B | B |
| Ex. 16 | 00300-ACT_BLACK | Pre-processing fluid 4 | Hand spraying | 352 | Inks 1 to 5 | 270 | 20 | B | A | A |
| Ex. 17 | 00300-ACT_BLACK | Pre-processing fluid 5 | Hand spraying | 352 | Inks 6 to 10 | 270 | 20 | A | B | A |
| Ex. 18 | 00300-ACT_BLACK | Pre-processing fluid 6 | Hand spraying | 352 | Inks 11 to 15 | 270 | 20 | A | A | A |
| Ex. 19 | Biodagradable polyester fiber | Pre-processing fluid 2 | Hand spraying | 200 | Inks 6 to 9 | — | 20 | Not evaluated | A | A |
| Ex. 20 | 00085-CVT_BLACK | Pre-processing fluid 18 | Hand spraying | 336 | Inks 6 to 10 | 220 | 20 | C | B | B |
| Ex. 21 | 00085-CVT_BLACK | Pre-processing fluid 4 | Hand spraying | 336 | Inks 1 to 5 | 220 | 20 | B | A | A |
| Comp. Ex. 1 | 00300-ACT_WHITE | None | — | — | Inks 1 to 4 | — | 20 | Not evaluated | D | C |
| Comp. Ex. 2 | 00085-CVT_BLACK | None | — | — | Inks 6 to 10 | 220 | 20 | E | C | C |
| Comp. Ex. 3 | 00085-CVT_BLACK | Pre-processing fluid 16 | Hand spraying | 336 | Inks 6 to 10 | 220 | 20 | D | C | B |
| Comp. Ex. 4 | 00085-CVT_BLACK | Pre-processing fluid 17 | Hand spraying | 336 | Inks 6 to 10 | 220 | 20 | B | D | C |
| Comp. Ex. 5 | 00300-ACT_BLACK | None | — | — | Inks 6 to 10 | 270 | 20 | E | C | C |
| Comp. Ex. 6 | 00300-ACT_BLACK | Pre-processing fluid 16 | Hand spraying | 352 | Inks 6 to 10 | 270 | 20 | E | C | B |
| Comp. Ex. 7 | 00300-ACT_BLACK | Pre-processing fluid 17 | Hand spraying | 352 | Inks 6 to 10 | 270 | 20 | B | D | C |

\*In Examples 1 to 3 and Comparative Example 1, the brightness by Hunter was not evaluated because the cloth was white and, thus, no meaningful evaluation of this property could be made.

\*In Examples 4 to 6 and Examples 10 to 12, color bleed was not evaluated because only the white ink was printed on the pre-processed cloth and, thus, evaluation of color bleed was not possible.

The present disclosure is directed to a set of inkjet inks according to (1) below. However, the present disclosure includes (2) to (11) below as embodiments.

(1) A set of inkjet inks used for forming an image by application of an ink on a cloth, the set including:
an ink; and
a pre-processing fluid,
wherein the pre-processing fluid contains water, a compound that flocculates an anionic compound, and at least one emulsified sizing agent.

(2) The set of inkjet inks according to (1),
wherein the at least one emulsified sizing agent is a rosin-based sizing agent, a compound represented by General formula (I) below, a polyacrylamide-based resin, or a fatty acid amide-based resin,

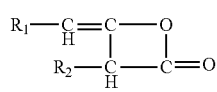

General formula (I)

where in General formula (I), $R_1$ and $R_2$ each independently represent an alkyl group containing from 12 through 22 carbon atoms.

(3) The set of inkjet inks according to (1) or (2),
wherein the rosin-based sizing agent is at least one selected from the group consisting of maleated rosin compounds and acrylated rosin compounds.

(4) The set of inkjet inks according to any one of (1) to (3),
wherein the ink contains an anionic compound.

(5) The set of inkjet inks according to any one of (1) to (4),
wherein the compound that flocculates an anionic compound is at least one selected from the group consisting of inorganic metal salts, organic acid metal salts, organic acid ammonium salts, and cation polymers.

(6) The set of inkjet inks according to any one of (1) to (5),
wherein the pre-processing fluid further contains nonionic water-dispersible resin particles.

(7) The set of inkjet inks according to any one of (1) to (6),
wherein the ink includes a white ink.

(8) An inkjet image forming method, for forming an image on a cloth using a set of inkjet inks including an ink and a pre-processing fluid, the inkjet image forming method including:
applying the pre-processing fluid to at least a region, on which an image is to be formed, of a cloth, and
inkjet-applying the ink to the region, to which the pre-processing fluid is applied, of the cloth obtained by the applying the pre-processing fluid,
wherein the pre-processing fluid contains water, a compound that flocculates an anionic compound, and at least one emulsified sizing agent.

(9) The inkjet image forming method according to (8),
wherein a white ink is applied to the cloth in the inkjet-applying the ink.

(10) The inkjet image forming method according to (9), further including
inkjet-applying a color ink on the white ink.

(11) The inkjet image forming method according to any one of (8) to (10), further including
heating and drying the cloth to which the ink is applied.
(12) An inkjet image forming apparatus, including:
a pre-processing fluid storage unit configured to store a pre-processing fluid;
an ink storage unit configured to store an ink;
a pre-processing fluid applying unit configured to apply the pre-processing fluid to at least a region, on which an image is to be formed, of a cloth; and
an ink applying unit configured to inkjet-apply the ink to the region, to which the pre-processing fluid is applied, of the cloth,
wherein the pre-processing fluid contains water, a compound that flocculates an anionic compound, and at least one emulsified sizing agent.

The set of inkjet inks according to any one of (1) to (7), the inkjet image forming method according to any one of (8) to (11), and the inkjet image forming apparatus according to (12) can solve the various problems in the related art and achieve the object of the present disclosure.

Further, the present invention is not limited to these embodiments, but various variations and modifications may be made without departing from the scope of the present invention.

What is claimed is:

1. A set of inkjet inks used for forming an image by application of an ink on a cloth, the set comprising:
an ink; and
a pre-processing fluid,
wherein the pre-processing fluid contains water, a compound that flocculates an anionic compound, and at least one emulsified sizing agent,
wherein the at least one emulsified sizing agent is a rosin-based sizing agent or a compound represented by General formula (I) below

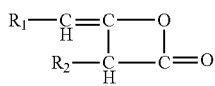

General formula (I)

wherein in General formula (I), $R_1$ and $R_2$ each independently represent an alkyl group containing from 12 through 22 carbon atoms,
wherein a content of the at least one emulsified sizing agent in the pre-processing fluid expressed as a content of the sizing agent having a solid form, is 0.5% by mass or greater and 5% by mass or less.

2. The set of inkjet inks according to claim 1, wherein the rosin-based sizing agent is at least one selected from the group consisting of maleated rosin compounds and acrylated rosin compounds.

3. The set of inkjet inks according to claim 1,
wherein the ink contains an anionic compound.

4. The set of inkjet inks according to claim 1,
wherein the compound that flocculates an anionic compound is at least one selected from the group consisting of inorganic metal salts, organic acid metal salts, organic acid ammonium salts, and cation polymers.

5. The set of inkjet inks according to claim 1,
wherein the pre-processing fluid further contains nonionic water-dispersible resin particles.

6. The set of inkjet inks according to claim 1,
wherein the ink includes a white ink.

7. The set of inkjet inks according to claim 1, wherein a content of the at least one emulsified sizing agent in the pre-processing fluid, expressed as a content of the sizing agent having a solid form, is 1% by mass or greater and 3% by mass or less.

8. An inkjet image forming method, for forming an image on a cloth using a set of inkjet inks including an ink and a pre-processing fluid, the inkjet image forming method comprising:
applying the pre-processing fluid to at least a region, on which an image is to be formed, of a cloth, and
inkjet-applying the ink to the region, to which the pre-processing fluid is applied, of the cloth obtained by the applying the pre-processing fluid,
wherein the pre-processing fluid contains water, a compound that flocculates an anionic compound, and at least one emulsified sizing agent,
wherein the at least one emulsified sizing agent is a rosin-based sizing agent or a compound represented by General formula (I) below,

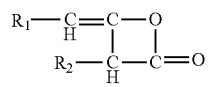

General formula (I)

wherein in General formula (I), $R_1$ and $R_2$ each independently represent an alkyl group containing from 12 through 22 carbon atoms,
wherein a content of the at least one emulsified sizing agent in the pre-processing fluid, expressed as a content of the sizing agent having a solid form, is 0.5% by mass or greater and 5% by mass or less.

9. The inkjet image forming method according to claim 8, wherein a white ink is applied to the cloth in the inkjet-applying the ink.

10. The inkjet image forming method according to claim 9, further comprising
inkjet-applying a color ink on the white ink.

11. The inkjet image forming method according to claim 8, further comprising
heating and drying the cloth to which the ink is applied.

12. An inkjet image forming apparatus, comprising:
a pre-processing fluid storage unit configured to store a pre-processing fluid;
an ink storage unit configured to store an ink;
a pre-processing fluid applying unit configured to apply the pre-processing fluid to at least a region, on which an image is to be formed, of a cloth; and
an ink applying unit configured to inkjet-apply the ink to the region, to which the pre-processing fluid is applied, of the cloth,
wherein the pre-processing fluid contains water, a compound that flocculates an anionic compound, and at least one emulsified sizing agent,
wherein the at least one emulsified sizing agent is a rosin-based sizing agent or a compound represented by General formula (I) below,

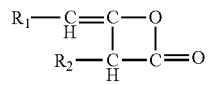

General formula (I)

wherein in General formula (I), $R_1$ and $R_2$ each independently represent an alkyl group containing from 12 through 22 carbon atoms, wherein a content of the at least one emulsified sizing agent in the pre-processing fluid expressed as a content of the sizing agent having a solid form, is 0.5% by mass or greater and 5% by mass or less.

* * * * *